(12) United States Patent
Mysore et al.

(10) Patent No.: US 12,198,030 B1
(45) Date of Patent: Jan. 14, 2025

(54) VALIDATING VECTOR CONSTRAINTS OF OUTPUTS GENERATED BY MACHINE LEARNING MODELS

(71) Applicant: Citibank, N.A., New York, NY (US)

(72) Inventors: Vishal Mysore, Mississauga (CA); Ramkumar Ayyadurai, Jersey City, NJ (US); Chamindra Desilva, London (GB)

(73) Assignee: CITIBANK, N.A.

( * ) Notice: Subject to any disclaimer, the term of this patent is extended or adjusted under 35 U.S.C. 154(b) by 0 days.

(21) Appl. No.: 18/653,858

(22) Filed: May 2, 2024

Related U.S. Application Data

(63) Continuation-in-part of application No. 18/637,362, filed on Apr. 16, 2024, now Pat. No. 12,111,754.

(51) Int. Cl.
*G06N 20/20* (2019.01)

(52) U.S. Cl.
CPC .................. *G06N 20/20* (2019.01)

(58) Field of Classification Search
None
See application file for complete search history.

(56) References Cited

U.S. PATENT DOCUMENTS

| | | |
|---|---|---|
| 9,842,045 B2 | 12/2017 | Heorhiadi et al. |
| 11,573,848 B2 | 2/2023 | Linck et al. |
| 11,656,852 B2 | 5/2023 | Mazurskiy |
| 11,750,717 B2 | 9/2023 | Walsh et al. |
| 11,875,123 B1 | 1/2024 | Ben David et al. |
| 11,875,130 B1 | 1/2024 | Bosnjakovic et al. |
| 11,924,027 B1 | 3/2024 | Mysore et al. |
| 11,947,435 B2 | 4/2024 | Boulineau et al. |

(Continued)

FOREIGN PATENT DOCUMENTS

WO 2024020416 A1 1/2024

OTHER PUBLICATIONS

Nauta, M., et al., "From Anecdotal Evidence to Quantative Evaluation Methods: A Systematic Review of Evaluating Explainable AI" ACM Computing Surveys, vol. 55 No. 13s Article 295, 2023 [retrieved Jul. 3, 2024].
Generative machine learning models; IPCCOM000272835D, Aug. 17, 2023. (Year: 2023).
Peers, M., "What California AI Bill Could Mean," The Briefing, published and retrieved Aug. 30, 2024, 8 pages, https://www.theinformation.com/articles/what-california-ai-bill-could-mean.

(Continued)

*Primary Examiner* — Alan Chen
(74) *Attorney, Agent, or Firm* — Perkins Coie LLP

(57) ABSTRACT

The technology evaluates the compliance of an AI application with predefined vector constraints. The technology employs multiple specialized models trained to identify specific types of non-compliance with the vector constraints within AI-generated responses. One or more models evaluate the existence of certain patterns within responses generated by an AI model by analyzing the representation of the attributes within the responses. Additionally, one or more models can identify vector representations of alphanumeric characters in the AI model's response by assessing the alphanumeric character's proximate locations, frequency, and/or associations with other alphanumeric characters. Moreover, one or more models can determine indicators of vector alignment between the vector representations of the AI model's response and the vector representations of the predetermined characters by measuring differences in the direction or magnitude of the vector representations.

20 Claims, 13 Drawing Sheets

(56) References Cited

U.S. PATENT DOCUMENTS

| | | |
|---|---|---|
| 11,960,515 B1 | 4/2024 | Pallakonda et al. |
| 11,983,806 B1 | 5/2024 | Ramesh et al. |
| 11,990,139 B1 | 5/2024 | Sandrew |
| 11,995,412 B1 | 5/2024 | Mishra |
| 12,001,463 B1 | 6/2024 | Pallakonda et al. |
| 12,026,599 B1 | 7/2024 | Lewis et al. |
| 2017/0262164 A1 | 9/2017 | Jain et al. |
| 2022/0114399 A1* | 4/2022 | Castiglione .......... G06V 10/751 |
| 2022/0198304 A1 | 6/2022 | Szczepanik et al. |
| 2022/0311681 A1 | 9/2022 | Palladino et al. |
| 2022/0318654 A1 | 10/2022 | Lin et al. |
| 2023/0269272 A1 | 8/2023 | Dambrot et al. |
| 2024/0020538 A1 | 1/2024 | Socher et al. |
| 2024/0095077 A1 | 3/2024 | Singh et al. |
| 2024/0129345 A1 | 4/2024 | Kassam et al. |

OTHER PUBLICATIONS

Zhou, Y., Liu, Y., Li, X., Jin, J., Qian, H., Liu, Z., Li, C., Dou, Z., Ho, T., & Yu, P. S. (2024). Trustworthiness in Retrieval-Augmented Generation Systems: A Survey. ArXiv./abs/2409.10102.

Empower Your Team with a Compliance Co-Pilot, Sedric, retrieved on Sep. 25, 2024. https://www.sedric.ai/.

Cranium, Adopt & Accelerate AI Safely, retrieved on Nov. 7, 2024, from https://cranium.ai/.

Guldimann, P., et al. "COMPL-AI Framework: A Technical Interpretation and LLM Benchmarking Suite for the EU Artificial Intelligence Act," arXiv:2410.07959v1 [cs.CL] Oct. 10, 2024, 38 pages.

Mathews, A. W., "What AI Can Do in Healthcare—and What It Should Never Do," The Wall Street Journal, published on Aug. 21, 2024, retrieved on Sep. 5, 2024, https://www.wsj.com.

\* cited by examiner

VALIDATING VECTOR CONSTRAINTS OF OUTPUTS GENERATED BY MACHINE LEARNING MODELS

CROSS-REFERENCE TO RELATED APPLICATION(S)

This application is a continuation-in-part of U.S. patent application Ser. No. 18/637,362 entitled "DYNAMICALLY VALIDATING AI APPLICATIONS FOR COMPLIANCE" filed on Apr. 16, 2024. The content of the foregoing application is incorporated herein by reference in its entirety.

TECHNICAL FIELD

The systems, methods, and computer-readable media disclosed herein relate generally to determining compliance of artificial intelligence (AI) applications. Some implementations described herein relate to evaluating an adherence of outputs of the AI application to predefined vector constraints.

BACKGROUND

Artificial intelligence (AI) models often operate based on extensive and enormous training models. The models include a multiplicity of inputs and how each should be handled. When the model receives a new input, the model produces an output based on patterns determined from the data the model was trained on. A vector representation is a mathematical abstraction used to represent text documents (or more generally, items) as vectors such that the distance between vectors represents the relevance between the documents. The vector representation encapsulates information about the text's attributes or features in a multidimensional space, where each dimension corresponds to a specific characteristic or property of the entity. For example, in natural language processing (NLP) tasks, words or characters can be represented as vectors, with each dimension capturing semantic or syntactic information about the word or character. Vector constraints involve defining boundaries or restrictions on the vector representations generated by the AI model. The vector constraints can be applied to ensure that the output of the AI model remains within specified bounds or adheres to certain criteria. However, traditional approaches to vector constraints involving the manual interpretation of outputs from an AI model are labor-intensive, error-prone, and lack scalability, making the approach increasingly unsustainable in the face of the rapidly growing presence of AI models.

Figure 1:
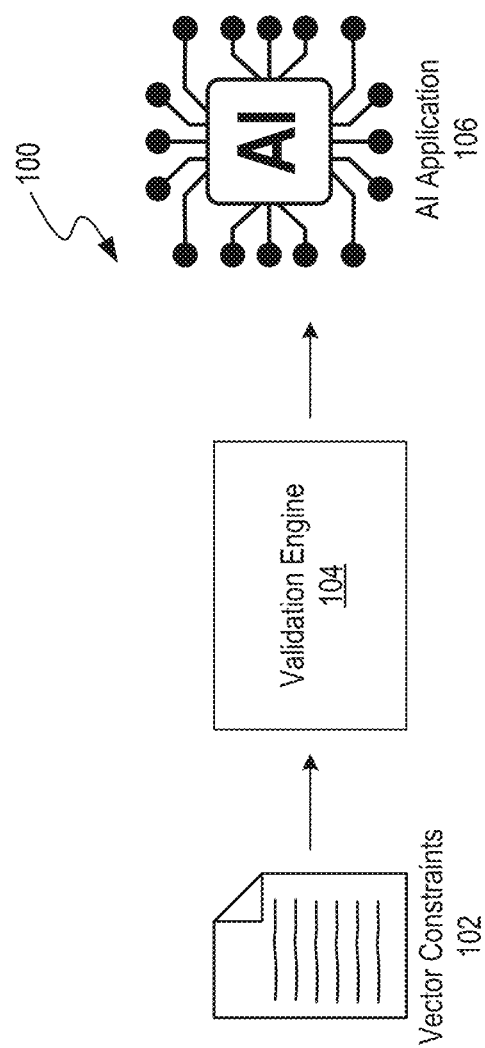
FIG. 1 is a block diagram illustrating an example environment for determining AI compliance, in accordance with some implementations of the present technology.

The drawings have not necessarily been drawn to scale. For example, some components and/or operations may be separated into different blocks or combined into a single block for the purposes of discussion of some of the implementations of the disclosed system. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents and alternatives falling within the scope of the technology as defined by the appended claims.

DETAILED DESCRIPTION

AI applications offer a powerful framework for extracting insights and making predictions from data. One of the key advantages of AI applications lies in an AI model's ability to automatically identify patterns and relationships within complex datasets, even in the absence of explicit programming. The capability enables AI applications to uncover relationships, predict future outcomes, and drive data-driven decision-making across various fields. However, as AI technologies continue to evolve, so do the regulatory landscapes governing the created AI applications. AI applications face increasing scrutiny and legal obligations to ensure that AI applications comply with the evolving regulations and ethical standards.

Compliance of AI applications includes adhering to an array of vector constraints (e.g., guidelines, regulations, standards) related to ethical or regulatory considerations, such as protections against bias, harmful language, and intellectual property (IP) rights. For example, vector constraints can include requirements that require AI applications to produce outputs that are free from bias, harmful language, and/or IP rights violations to uphold ethical standards and protect users. The AI model within the AI application should implement testing and validation procedures to identify and mitigate biases in AI-generated outputs, ensuring fairness and equity in decision-making processes. Additionally, AI systems should incorporate mechanisms to detect and filter out harmful language, such as hate speech and harassment, from outputs to promote a safe and respectful environment for users. Furthermore, AI outputs should respect copyright and trademark laws by avoiding the use of copyrighted material without proper authorization and attributing sources appropriately. By adhering to the vector constraints, organizations can ensure that AI outputs are ethical, compliant with legal requirements, and conducive to positive user experiences.

Traditional approaches to regulatory compliance often involve manual interpretation of regulatory texts, followed by ad-hoc efforts to align AI systems with compliance requirements. However, the manual process is subjective, lacks scalability, and is error-prone, which makes the approach increasingly unsustainable in the face of growing guidelines and the rapid prevalence of AI applications. For example, traditional methods often rely on manual review processes conducted by human reviewers, which introduces subjectivity and bias into the detection process. Human judgment can be influenced by personal beliefs, cultural norms, and implicit biases, leading to inconsistencies and inaccuracies in identifying problematic content. For example, a human reviewer can interpret certain language or imagery differently based on the reviewer's individual perspective, resulting in varying assessments of whether the content is biased, harmful, or infringing on IP rights. The subjectivity undermines the objectivity and reliability of the detection process, potentially allowing biased or harmful content to go undetected or improperly flagged.

Traditional methods for content moderation can have limited coverage and detection capabilities, particularly when it comes to identifying subtle or context-dependent forms of bias, harmful language, or IP violations. Human reviewers may focus on obvious or explicit violations while overlooking more nuanced or covert forms of problematic content. For example, detecting implicit biases or microaggressions in language requires a deeper understanding of sociocultural contexts and can be challenging for human reviewers to identify consistently. Similarly, detecting IP violations such as trademark infringement or patent infringement may require specialized knowledge and expertise that human reviewers may lack.

Further, traditional methods for content moderation can lack consistency and standardization in the approach to identifying and addressing bias, harmful language, and IP violations. Different human reviewers may apply different standards or interpretations when assessing content, leading to inconsistent outcomes and enforcement decisions. The lack of consistency undermines the fairness and integrity of the moderation process, potentially leading to disputes or challenges regarding the enforcement of content guidelines or regulations. Additionally, the lack of standardization in content moderation practices can hinder efforts to establish clear and transparent guidelines for content creators and platform users.

Additionally, traditional methods for detecting bias, harmful language, and IP violations often lack scalability and timeliness, making traditional methods ill-equipped to handle the vast amounts of digital content generated online. Manual review processes require significant human effort and resources to review large volumes of content effectively, leading to bottlenecks and delays in the detection and remediation of problematic content. Human reviewers may struggle to keep pace with the rapid proliferation of online content across various platforms and channels, resulting in backlogs of content awaiting review and increasing the risk of undetected violations. Moreover, manual review processes are inherently time-consuming, requiring an analysis of each piece of content to determine compliance with relevant guidelines or regulations. The time-intensive nature can lead to delays in identifying and addressing problematic content, allowing the problematic content to spread and cause harm before mitigation measures can be implemented. Additionally, traditional methods can lack the scalability needed to adapt to changes in content volume, emerging trends, or evolving tactics used by bad actors to evade detection.

Thus, the lack of standardized processes and tools for evaluating regulatory compliance leads to inefficiencies in compliance management within and across organizations. The consequences of inadequate detection and mitigation of bias, harmful language, and IP violations in online content can be severe and wide-reaching. Biased or discriminatory content can perpetuate stereotypes, reinforce inequality, and harm marginalized groups. Harmful language, such as hate speech or harassment, can incite violence, perpetuate harm, and create hostile environments. Additionally, IP violations, such as copyright infringement or trademark infringement, can undermine innovation, creativity, and economic competitiveness.

This document discloses methods, apparatuses, and systems that provide a systematic and automated approach to assess and ensure adherence to guidelines (e.g., preventing bias, harmful language, IP violations). The disclosed technology addresses the complexities of compliance for AI applications. In some implementations, the system uses a meta-model that consists of one or more models to analyze different aspects of AI-generated content. For example, one of the models can be trained to identify certain patterns (e.g., patterns indicative of bias) within the content by evaluating demographic attributes and characteristics present in the content. By quantifying biases within the training dataset, the system can effectively scan content for disproportionate associations with demographic attributes and provide insights into potential biases that can impact the fairness and equity of AI applications.

Additionally, the system can include model(s) that identify particular vector representations of alphanumeric characters within the content. The models analyze factors such as proximate locations, frequency, and/or associations between alphanumeric characters to gain insight into the structure and composition of AI-generated content. By examining the vector representations, the system can detect subtle nuances and contextual dependencies that can indicate the presence or absence of harmful language.

Further, the system can include model(s) trained to analyze the content for similarities with predefined IP content in the training dataset. By measuring the similarity between the content generated by the AI model and known instances of IP content, the system can effectively flag potential violations in real-time. Measuring the similarity includes identifying patterns, phrases, or elements within the content that closely resemble copyrighted text, trademarks, or other protected intellectual property. By quantifying the similarities, the system can provide warnings of potential infringement, allowing organizations to take preemptive action to mitigate legal risks and protect intellectual property rights.

In some implementations, the system generates actionable validation actions (e.g., test cases) that operate as input into the AI model for evaluating AI application compliance. Based on the provided training dataset, the system identifies relevant compliance requirements and operational boundaries that must be complied with in an AI application. The system constructs a set of validation actions that cover various scenarios derived from the regulatory requirements. The validation actions can include prompts, expected outcomes, and/or expected explanations.

The system evaluates the AI application against the set of validation actions and generates one or more compliance indicators and/or a set of actions based on comparisons between expected and actual outcomes and explanations. For example, if the AI application's response meets the expected outcome and explanation, the AI application receives a positive compliance indicator. If there are discrepancies, the system can flag the discrepancies as areas requiring further attention or modification and provide a set of actions that detail the modifications that can be made. In some implementations, the system provides mechanisms for ongoing compliance monitoring and auditing to ensure that AI applications remain in compliance with the guidelines. For example, the system can continuously monitor AI applications for deviations from established vector constraints and thresholds. The system enables organizations to detect and remediate compliance issues in real-time, reducing the likelihood of guideline violations or enforcement actions.

In some implementations, the system can incorporate a correction module that automates the process of implementing corrections to remove non-compliant content from AI models. The correction module adjusts the parameters of the AI model and/or updates training data based on the findings of the detection models to ensure that non-compliant content is promptly addressed and mitigated. By automating the correction process, the system ensures that non-compliant content is promptly addressed, minimizing the risk of harmful outcomes associated with biased or inappropriate AI-generated content.

For example, in an AI application directed toward assessing loan applications, various factors such as credit history, income, and employment status, can be used to predict the creditworthiness of applicants and determine whether to approve or deny the applicants' loan requests. Without systems to monitor and evaluate the AI application's decision-making processes, there is a risk that non-compliant decision-making factors are used in predicting the creditworthiness of applicants. The lack of transparency and interpretability in AI algorithms makes it difficult for regulatory authorities to assess whether the AI application's outcomes are fair and unbiased. By implementing the implementations described herein, the institution can obtain a set of relevant training data defining the operation boundaries of the AI application, train an ML model to construct validation actions that evaluate the AI application's compliance with the operation boundaries, and generate one or more compliance indicators and/or set of actions to identify areas of non-compliance and guide corrective actions. For example, the institution can use the system to evaluate the AI application against a set of validation actions designed to assess the AI application's adherence to regulations prohibiting discriminatory lending practices. By supplying prompts related to prohibited attributes such as race or gender into the AI system and comparing the expected outcomes and explanations to the case-specific outcomes and explanations generated by the system, the institution can identify any discrepancies or biases that can exist and take appropriate measures to address the discrepancies or biases.

Unlike manual processes that rely on humans to interpret guidelines and assess compliance, the system can detect subtleties that traditional methods for content moderation often struggle to identify. The system can parse and analyze text data within the response of the AI model and identify nuanced expressions, connotations, and cultural references that can signal biased or harmful content. The system detects subtle forms of bias, such as implicit stereotypes or microaggressions, which can evade detection by human reviewers unfamiliar with the nuances of language and culture. Additionally, the system can understand the subtleties of language use within specific contexts by considering the surrounding context of a piece of content and including the broader conversation, cultural norms, and user intent.

Additionally, by standardizing the validation criteria, the system establishes clear and objective criteria for assessing the content of an AI application, thereby minimizing the influence of individual biases or interpretations. The standardized approach ensures that content moderation decisions are based on consistent criteria and are not influenced by the personal opinions or preferences of human moderators. As a result, users can expect fair and impartial treatment regardless of who is reviewing the content, fostering trust and confidence in the moderation process. Moreover, the system enables platform operators to enforce content policies and guidelines consistently across all platforms, regardless of scale or volume. The system can process large volumes of content rapidly and consistently, ensuring that all content is evaluated against the same set of standards and guidelines, reducing the likelihood of discrepancies or inconsistencies in enforcement decisions.

Further, the system eliminates the need for human reviewers to manually sift through vast amounts of content, significantly reducing the time and effort required to moderate AI applications. The system ensures that problematic content can be identified and addressed more quickly, mitigating the risk of harmful or inappropriate content circulating unchecked in the outputs of AI applications. The system more accurately assesses AI-generated content for bias, harmful language, and IP violations, without the need for extensive manual intervention. The automation streamlines the moderation process, enabling platforms to review large volumes of content quickly and efficiently, while minimizing the need for human oversight.

In the following description, for the purposes of explanation, numerous specific details are set forth in order to provide a thorough understanding of the implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

AI Model Validation System

FIG. 1 is a block diagram illustrating an example environment 100 for determining AI compliance, in accordance with some implementations of the present technology. Environment 100 includes vector constraints 102, validation engine 104, and AI application 106. AI application 106 and validation engine 104 are implemented using components of example computer system 1300 illustrated and described in more detail with reference to FIG. 13. Likewise, implementations of example environment 100 can include different and/or additional components or can be connected in different ways.

The vector constraints 102 operate as an input into the validation engine 104. The vector constraints 102 can encompass guidelines and/or regulations such as regulatory standards, organizational policies, AI application-specific vector constraints, and industry best practices relevant to the AI application's 106 domain. For example, the vector constraints 102 can include best practices or legal obligations such as protections against bias, harmful language (e.g., toxic language), and/or IP violations.

Regulatory standards (e.g., governmental regulations) can include regulations gathered from authoritative sources such as government websites, legislative bodies, and regulatory agencies. Regulatory standards can be published in legal documents or official publications and cover aspects related to the development, deployment, and use of AI technologies within specific jurisdictions. Depending on the jurisdiction in which the platform operates, there can be legal obligations regarding the moderation of certain types of content, such as biased content, hate speech, harassment, or copyrighted material. Organizational policies include internal policies, procedures, and vector constraints established by organizations to govern AI-related activities within the organization's operations. Organizational policies can be developed in alignment with industry standards, legal requirements, and organizational objectives. Organizational policies can include standards for acceptable content, and/or procedures for determining violations. AI application-specific vector constraints include vector constraints that pertain to specific types of AI applications, such as unsupervised learning, natural language processing (NLP), and generative AI. Each type of AI application presents unique challenges and considerations in terms of compliance, ethical use, and/or regulatory adherence. For example, unsupervised learning algorithms, where the model learns from input data without labeled responses, can be subject to vector constraints that prevent bias and discrimination in unsupervised learning models. Natural language processing (NLP) technologies, which enable computers to understand, interpret, and generate human language, can be subject to specific vector constraints aimed at safeguarding user privacy. Generative AI, which autonomously creates new content, can focus on intellectual property rights, content moderation, and ethical use cases. AI developers can need to incorporate additional mechanisms for copyright protection, content filtering, and/or user consent management to comply with vector constraints related to generative AI technologies.

The validation engine 104 can be communicatively connected to an API and/or other data sources containing regulatory documents and organizational policies to obtain the vector constraints 102. Connecting to an API allows for real-time access to the latest guidelines and updates and ensures that the validation process is based on the most current guidelines. For example, the API can provide endpoints for querying specific regulations or policies based on keywords, categories, or jurisdictions that enable dynamic retrieval of relevant guidelines.

In some implementations, vector constraints 102 are obtained by manual input by users. For example, users input relevant regulations and policies (e.g., vector constraints 102) directly into the validation engine 104 through a user interface communicatively connected to the validation engine 104. In some implementations, vector constraints 102 are obtained from pre-existing databases or repositories maintained by regulatory bodies, industry organizations, and/or third-party providers. The databases can be periodically updated and synchronized with the validation engine 104 to ensure alignment with the latest regulatory changes and industry standards. Additionally, machine learning algorithms can be employed to automatically identify and extract vector constraints 102 from unstructured text data, reducing the need for manual intervention in the data collection process.

To incorporate vector constraints 102 into the validation process, the vector constraints 102 can be parsed, processed, and translated into actionable criteria for assessment. The validation engine 104 can analyze the textual content of the vector constraints 102, extract relevant information, and categorize the vector constraints 102 based on predefined criteria (e.g., standards, rules, or parameters established in advance to guide the analysis and categorization of textual content). For example, even if the vector constraints 102 exist in different formats and structures, Natural Language Processing (NLP) techniques can be used to parse each text and identify key regulations, policies, and practices embedded within the differently formatted vector constraints 102. The validation engine 104 can identify specific terms, phrases, or clauses that likely denote regulatory requirements, as well as understand the context and intent behind the provisions. For example, the validation engine 104 identifies terms or phrases indicating regulations concerning the collection of personal data, such as "consent," "data minimization," or "lawful basis," and categorizes vector constraints 102 including the identified words and phrases as containing provisions related to obtaining user consent for data processing or specifying permissible purposes for data collection. Further methods of identifying relevant features within the vector constraints 102 are discussed with reference to FIGS. 4-7.

In some implementations, once the vector constraints 102 are obtained, the vector constraints 102 are pre-processed into a standardized format suitable for assessment by the validation engine 104. For example, the vector constraints 102 can be encoded into a structured representation (e.g., JSON, XML), with specific fields for criteria, requirements, and/or thresholds. In some implementations, the vector constraints 102 are categorized and tagged based on the extent of the vector constraint's 102 relevance to different aspects of AI compliance (e.g., fairness, transparency, privacy, security). Example methods of identifying relevant vector constraints and tagging the vector constraints 102 are discussed further in FIGS. 4-7.

The validation engine 104 evaluates the AI application's 106 compliance with the vector constraints 102. The validation engine 104 inputs validation actions (e.g., test cases) created from the criteria in the vector constraints 102 into the AI application 106 and evaluates the AI application's 106 outcomes and explanations. Methods of evaluating the AI application 106's compliance with the vector constraints 102 are discussed in further detail with references to FIGS. 8 and 9. In some implementations, manual review by another individual can be used to validate the results of the validation engine.

The AI application's 106 outcome and explanation include alphanumeric characters representing the result of the AI application's 106 decision-making process. For example, in a loan approval application, the outcome can consist of alphanumeric values indicating whether a loan application is approved or denied based on the AI application's 106 assessment of the applicant's creditworthiness. The explanation generated by the AI application 106 includes a set of descriptors associated with a series of steps taken by the AI application 106 to arrive at the outcome (e.g., result). The descriptors provide insights into the decision-making process followed by the AI application 106, such as the factors considered, the data utilized, and the reasoning behind the decision. The descriptors can encompass various elements such as a ranking of the considered feature based on importance, decision paths, confidence scores, or probabilistic estimates associated with different outcomes.

Figure 2:
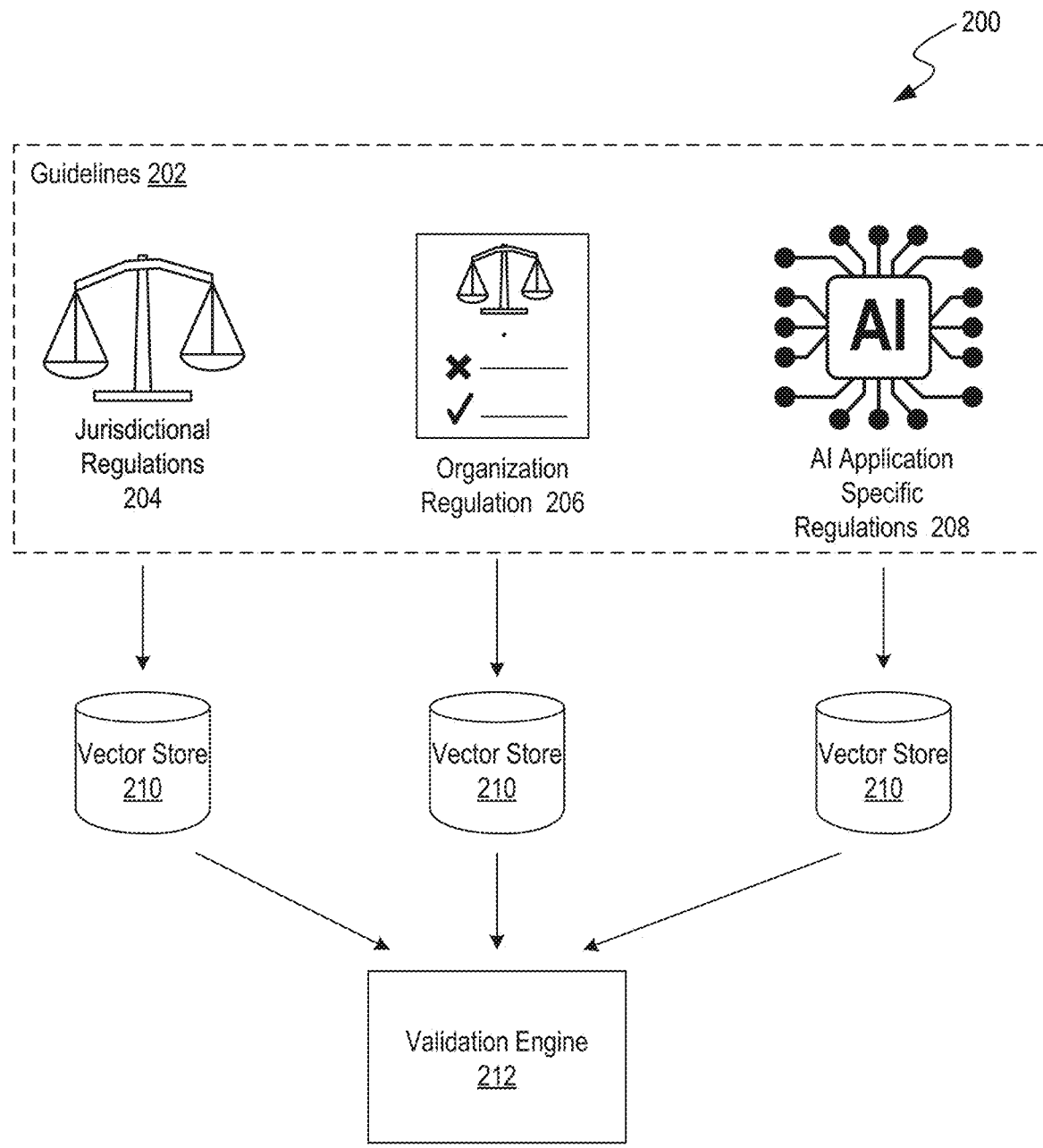
FIG. 2 is a block diagram illustrating an example environment for using the guidelines input into the validation engine for determining AI compliance, in accordance with some implementations of the present technology.

FIG. 2 is a block diagram illustrating an example environment 200 for using the guidelines input into the validation engine for determining AI compliance, in accordance with some implementations of the present technology. Environment 200 includes guidelines 202 (e.g., jurisdictional regulations 204, organization regulation 206, AI application-specific regulations 208), vector store 210, and validation engine 212. Guidelines 202 can be any of the vector constraints 102 illustrated and described in more detail with reference to FIG. 1. Validation engine 212 is the same as or similar to validation engine 104 illustrated and described in more detail with reference to FIG. 1. Vector store 210 and validation engine 212 are implemented using components of example computer system 1300 illustrated and described in more detail with reference to FIG. 13. Likewise, embodiments of example environment 200 can include different and/or additional components or can be connected in different ways.

Guidelines 202 can include various elements such as jurisdictional regulations 204, organizational regulations 206, and AI applications-specific regulations 208 (e.g., unsupervised learning, natural language processing (NLP), generative AI). Jurisdictional regulations 204 (e.g., governmental regulations) can include regulations gathered from authoritative sources such as government websites, legislative bodies, and regulatory agencies. Jurisdictional regulations 204 can be published in legal documents or official publications and cover aspects related to the development, deployment, and use of AI technologies within specific jurisdictions. Organizational regulations 206 includes internal policies, procedures, and guidelines established by organizations to govern AI-related activities within the organization's operations. Organizational regulations 206 can be developed in alignment with industry standards, legal requirements, and organizational objectives. AI application-specific regulations 208 include regulations that pertain to specific types of AI applications, such as unsupervised learning, natural language processing (NLP), and generative AI. Each type of AI application presents unique challenges and considerations in terms of compliance, ethical use, and/or regulatory adherence. For example, unsupervised learning algorithms, where the model learns from input data without labeled responses, may be subject to regulations that prevent bias and discrimination in unsupervised learning models. Natural language processing (NLP) technologies, which enable computers to understand, interpret, and generate human language, may be subject to specific regulations aimed at safeguarding user privacy. Generative AI, which autonomously creates new content, may focus on intellectual property rights, content moderation, and ethical use cases. AI developers may need to incorporate additional mechanisms for copyright protection, content filtering, and/ or user consent management to comply with regulations related to generative AI technologies.

The guidelines 202 are stored in a vector store 210. The vector store 210 stores the guidelines 202 in a structured and accessible format (e.g., using distributed databases or NoSQL stores), which allows for efficient retrieval and utilization by the validation engine 212. In some implementations, the guidelines 202 are preprocessed to remove any irrelevant information, standardize the format, and/or organize the guidelines 202 into a structured database schema. Once the guidelines 202 are prepared, the guidelines 202 can be stored in a vector store 210 using distributed databases or NoSQL stores.

To store the guidelines 202 in the vector store 210, the guidelines 202 can be encoded into vector representations for subsequent retrieval by the validation engine 212. The textual data of the guidelines 202 are transformed into numerical vectors that capture the semantic meaning and relationships between words or phrases in the guidelines 202. For example, the text is encoded into vectors using word embeddings and/or TF-IDF encoding. Word embeddings, such as Word2Vec or GloVe, learn vector representations of words based on the word's contextual usage in a large corpus of text data. Each word is represented by a vector in a high-dimensional space, where similar words have similar vector representations. TF-IDF (Term Frequency-Inverse Document Frequency) encoding calculates the importance of a word in a guideline relative to the word's frequency in the entire corpus of guidelines 202. For example, the system can assign higher weights to words that are more unique to a specific document and less common across the entire corpus.

In some implementations, the guidelines 202 are stored using graph databases such as Neo4j™ or Amazon Neptune™. Graph databases represent data as nodes and edges, allowing for the modeling of relationships between guidelines 202 to demonstrate the interdependencies. In some implementations, the guidelines 202 are stored in a distributed file system such as Apache Hadoop™ or Google Cloud Storage™. These systems offer scalable storage for large volumes of data and support parallel processing and distributed computing. Guidelines 202 stored in a distributed file system can be accessed and processed by multiple nodes simultaneously, which allows for faster retrieval and analysis by the validation engine.

The vector store 210 can be stored in a cloud environment hosted by a cloud provider, or a self-hosted environment. In a cloud environment, the vector store 210 has the scalability of cloud services provided by platforms (e.g., AWS™, Azure™). Storing the vector store 210 in a cloud environment entails selecting the cloud service, provisioning resources dynamically through the provider's interface or APIs, and configuring networking components for secure communication. Cloud environments allow the vector store 210 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 210 is stored on a private web server. Deploying the vector store 210 in a self-hosted environment entails setting up the server with the necessary hardware or virtual machines, installing an operating system, and storing the vector store 210. In a self-hosted environment, organizations have full control over the vector store 210, allowing organizations to implement customized security measures and compliance policies tailored to the organization's specific needs. For example, organizations in industries with strict data privacy and security regulations, such as finance institutions, can mitigate security risks by storing the vector store 210 in a self-hosted environment.

The validation engine 212 accesses the guidelines 202 from the vector store 210 to initiate the compliance assessment. The validation engine 212 can establish a connection to the vector store 210 using appropriate APIs or database drivers. The connection allows the validation engine 212 to query the vector store 210 and retrieve the relevant guidelines for the AI application under evaluation. Frequently accessed guidelines 202 are stored in memory, which allows the validation engine 212 to reduce latency and improve response times for compliance assessment tasks.

In some implementations, only the relevant guidelines are retrieved based on the specific AI application under evaluation. For example, metadata tags, categories, or keywords associated with the AI application can be used to filter the guidelines 202. Example methods of identifying relevant guidelines 202 are discussed further in FIG. 3.

The validation engine 212 evaluates the AI application's compliance with the retrieved guidelines 202, (e.g., using semantic search, pattern recognition, and machine learning techniques). For example, the validation engine 212 compares the vector representations of the different explanations and outcomes by calculating the cosine of the angle between the two vectors indicating the vectors' directional similarity. Similarly, for comparing explanations, the validation engine 212 can measure the intersection over the union of the sets of words in the expected and case-specific explanations. Further evaluation techniques in determining compliance of AI applications are discussed with reference to FIGS. 3-11.

Figure 3:
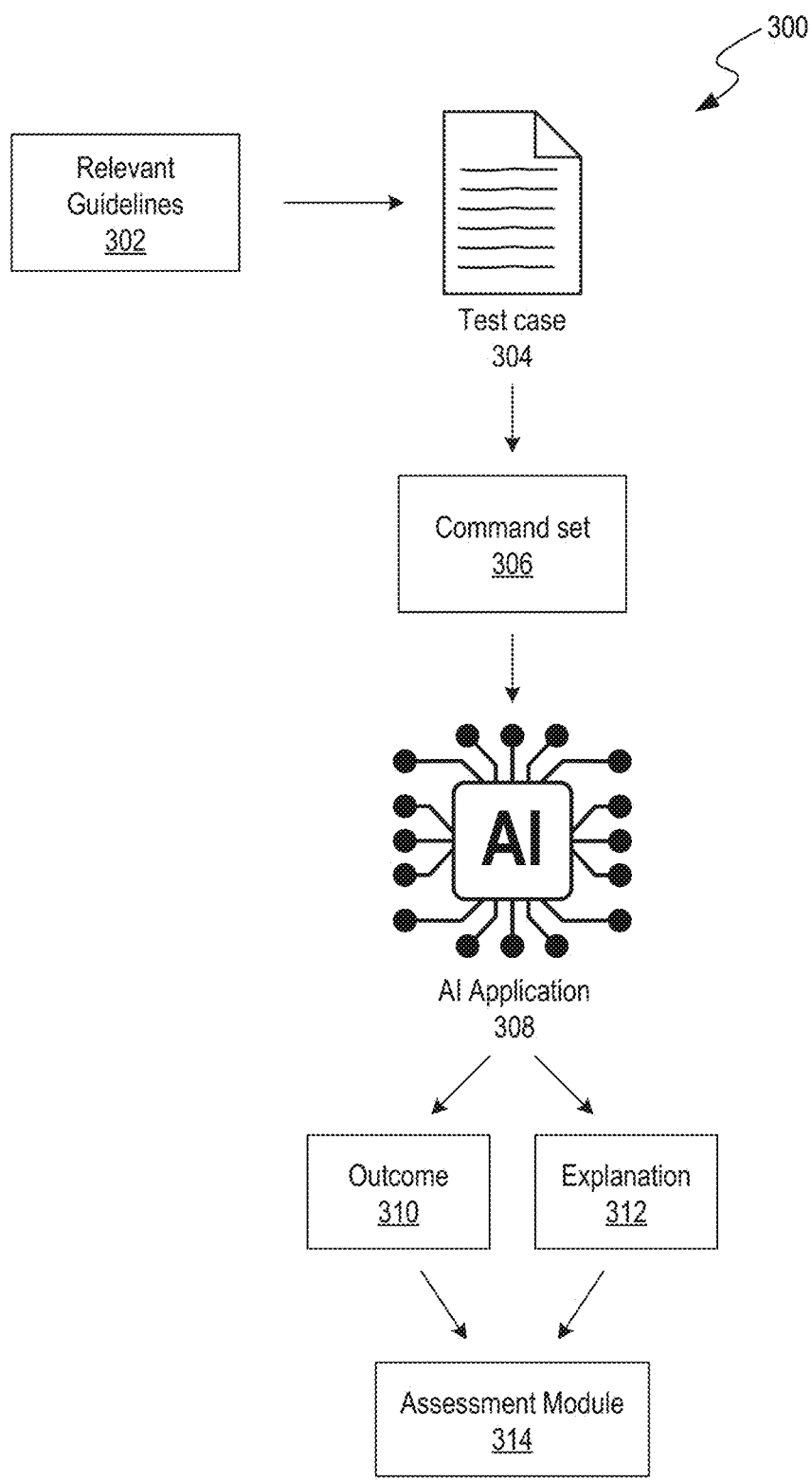
FIG. 3 is a block diagram illustrating an example environment using test cases derived from the guidelines to determine AI compliance, in accordance with some implementations of the present technology.

FIG. 3 is a block diagram illustrating an example environment 300 using test cases derived from the guidelines to determine AI compliance, in accordance with some implementations of the present technology. Environment 300 includes relevant guidelines 302, test case 304, command set 306, AI application 308, outcome 310, explanation 312, and assessment module 314. Guidelines 302 can be any of the vector constraints 102 illustrated and described in more detail with reference to FIG. 1. Example outcomes 310 and explanations 312 of the AI application are discussed further in FIG. 1. AI application 308 and assessment module 314 are implemented using components of example computer system 1300 illustrated and described in more detail with reference to FIG. 13. Likewise, embodiments of example environment 300 can include different and/or additional components or can be connected in different ways.

The relevant guidelines 302 can be specifically selected based on the specific context and requirements of the AI application being evaluated. For example, the system analyzes metadata tags, keywords, or categories associated with the guidelines 302 stored in the system's database. Using the specific context and requirements of the AI application, 308 the system filters and retrieves the relevant guidelines 302 from the database.

Various filters can be used to select relevant guidelines 302. In some implementations, the system uses natural language processing (NLP) to parse through the text of the guidelines and identify key terms, phrases, and clauses that denote regulatory obligations relevant to the AI application's domain. The specific terms related to the AI application's domain can be predefined and include, for example, "patient privacy" for healthcare sector applications. Using the specific terms related to the AI application's domain as a filter, the system can filter out the non-relevant guidelines.

In some embodiments, the guidelines are stored in vector space. Further methods of storing the guidelines 302 in vector space are discussed in FIG. 2. To identify the relevant guidelines 302 from the guidelines, the system can determine the specific terms to use as filters by calculating the similarity between vectors representing domain-specific terms (e.g., "healthcare") and vectors representing other terms related to the domain (e.g., "patient privacy"), domain-specific terms can be identified based on the proximity of the other terms to known terms of interest. A similarity threshold can be applied to filter out terms that are not sufficiently similar to known domain-specific terms.

In some implementations, the system can tag relevant guidelines 302 with attributes that help contextualize the relevant guidelines 302. The tags serve as markers that categorize and organize the guidelines based on predefined criteria, such as regulatory topics (e.g., data privacy, fairness, transparency) or jurisdictional relevance (e.g., regional regulations, industry standards). The tags provide a structured representation of the guidelines and allow for easier retrieval, manipulation, and analysis of regulatory content. The tags and associated metadata can be stored in a structured format, such as a database, where each guideline 302 is linked to the guideline's 302 corresponding tags and regulatory provisions. Additionally, the guidelines 302 can be represented in a vector space model, where each guideline is mapped to a high-dimensional vector representing the guideline's 302 semantic features and relationships with other guidelines.

The relevant guidelines 302 are used to construct test cases 304 (e.g., validation actions) which can include prompts that represent real-world scenarios, along with expected outcomes and explanations. In some implementations, the prompt can specify the guidelines to be considered when generating the expected outcomes and explanations. For example, when the prompt comprises a question related to whether a certain action complies with organizational regulations, the prompt indicates to the system to select/ target guidelines defined by the organizational regulations. The prompt from the test case 304 operates as a command set 306, which operates as the input for the AI application 308. Once the command set 306 is generated, the command set 306 is used as input for the AI application 308, which processes the commands and generates outcomes 310 and explanations 312 based on the AI application's 308 internal decision-making processes. Example outcomes and expected explanations of the AI application 308 are discussed further in FIG. 1. The test cases' 304 expected outcomes can include a set of alphanumeric characters. The expected explanation in the corresponding test case can include a set of descriptors associated with a series of steps taken to arrive at the expected outcome (e.g., result). The descriptors provide insights into the expected decision-making process, such as the factors considered, the data utilized, and the reasoning behind the decision. The descriptors can encompass various elements such as feature importance rankings, decision paths, confidence scores, or probabilistic estimates associated with different outcomes.

The AI application 308 processes the command set and generates an outcome 310 and explanation 312 on how the outcome 310 was determined based on the AI application's 308 internal algorithms and decision-making processes. The outcome 310 and explanation 312 are evaluated by the assessment module 314, which compares the outcome 310 and explanation 312 against the expected outcomes and explanations specified in the test case 304 derived from the relevant guidelines 302. Methods of evaluating the AI application 308's compliance with the relevant guidelines 302 are discussed in further detail with references to FIGS. 3-11. Any discrepancies or deviations between the observed and expected behavior are flagged as potential compliance issues, warranting further investigation or corrective action. The discrepancies or deviations can be transmitted as an alert to persons to validate the engine's performance.

Figure 4:
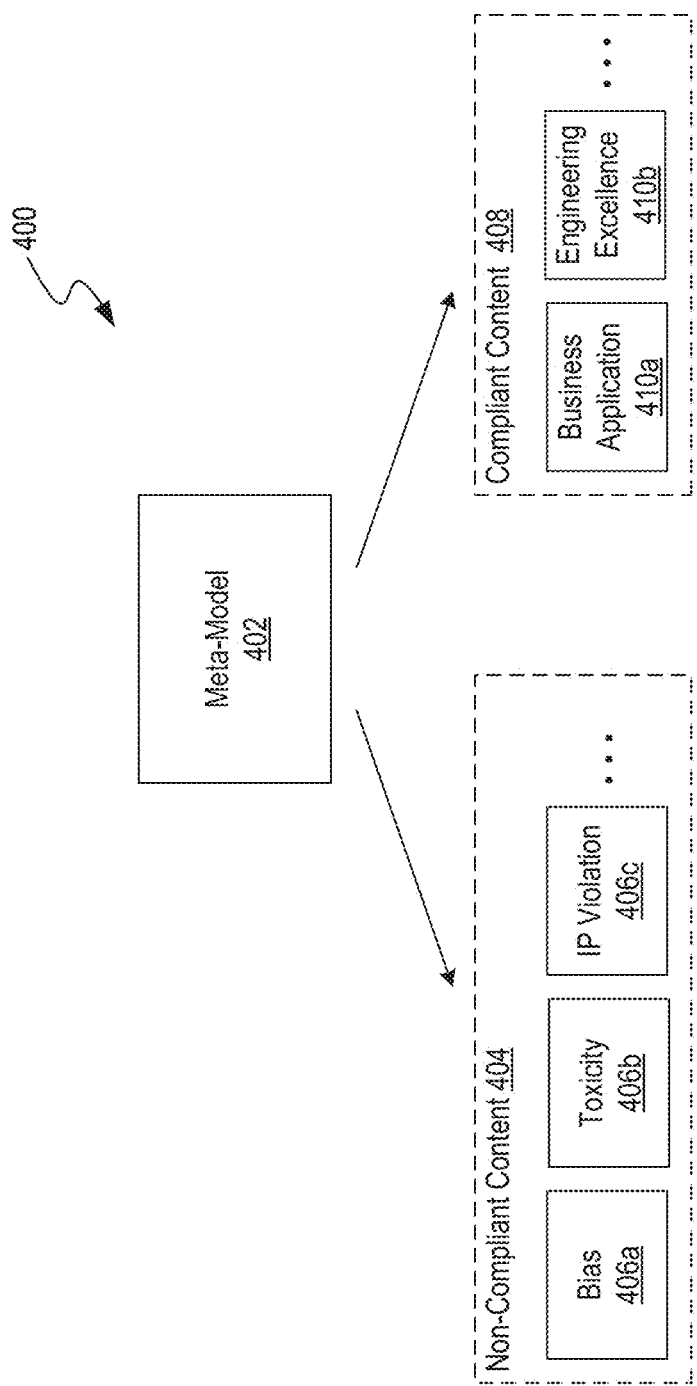
FIG. 4 is a block diagram illustrating an example environment for determining non-compliant content, in accordance with some implementations of the present technology.

FIG. 4 is a block diagram illustrating an example environment 400 for determining non-compliant content, in accordance with some implementations of the present technology. Environment 400 includes meta-model 402, non-compliant content 404, and compliant content 408. The meta-model 402 can be implemented using components of example computer system 1300 illustrated and described in more detail with reference to FIG. 13 and/or the validation engine 104 and validation engine 212 illustrated and described in more detail with reference to FIGS. 1 and 2 respectively. Likewise, implementations of example environment 400 can include different and/or additional components or can be connected in different ways.

The meta-model 402 discerns between different types of content based on predefined criteria and standards. The predefined criteria and standards against which content will be evaluated can be specific rules, thresholds, or guidelines (e.g., vector constraints 102) that determine what constitutes non-compliant content 404 and compliant content 408 within the context of the AI application. For example, the criteria can be informed by domain knowledge, regulatory requirements, or organizational policies.

Non-compliant content 404 encompasses various forms of content that deviate from established standards or regulations (e.g., vector constraints 102), such as biased content 406a, toxic content 406b, and/or IP violations 406c. Biased content 406a refers to unfair or prejudiced treatment within the content. Toxic content 406b, or harmful content, denotes harmful language including hate speech or misinformation. IP violations 406c indicate instances of infringement upon intellectual property rights.

To identify biased content 406a within the AI model, the system can analyze vector representations of the content and compare the vector representations against a reference dataset containing examples of unbiased content. By quantifying differences in the vector representations, the system can flag instances where the content demonstrates a disproportionate association with certain attributes. In some implementations, the system can employ machine learning algorithms trained to recognize patterns in the vector representations indicative of biased language directly from the vector space, without relying on reference datasets. Further methods of identifying biased content 406a are discussed with reference to FIG. 5.

Detecting toxic content 406b involves analyzing linguistic patterns and semantic cues within the vector representations of the content. Algorithms can be trained to recognize patterns indicative of harmful language, such as hate speech or misinformation, directly from the vector space. By evaluating the proximity, frequency, and/or association of specific terms or phrases within the vector space, the system can identify toxic content that deviates from acceptable language standards. Further methods of identifying toxic content 406b are discussed with reference to FIG. 6.

To detect IP violations 406c, the system can compare vector representations of the content against a database of known intellectual property content. Using similarity detection algorithms, the system can identify instances where the content bears resemblance to copyrighted material, trademarks, or other protected intellectual property. By measuring the similarity between vector representations, the system can flag potential IP violations for further review and action. Further methods of identifying IP violations 406c are discussed with reference to FIG. 7.

On the other hand, compliant content 408 meets the required criteria (e.g., adheres to vector constraints 102, such as, for example, not exhibiting bias, toxicity, or IP violations). The compliant content 408 can include business applications 410a, which adhere to industry standards and ethical guidelines, along with content showcasing engineering excellence 410b by meeting technical specifications and best practices. Categorizing content into non-compliant and compliant categories allows organizations to identify areas of concern within the AI model and take appropriate actions to mitigate risks, ensure compliance, and uphold ethical standards in the deployment of an AI application.

To categorize content as compliant or non-compliant, the meta-model 402 analyzes vector representations of the content and compares the vector representations against the vector constraints. In some implementations, machine learning algorithms are used to discern between non-compliant content 404 and compliant content 408. The meta-model 402 can be trained on a labeled dataset containing examples of different types of content, each tagged with its corresponding category (e.g., compliant or non-compliant). Through iterative training iterations, the meta-model 402 learns to identify patterns and features that distinguish between the various content types, thereby enabling the meta-model 402 to make accurate classifications. Alternatively, a rule-based system can be used within the meta-model 402. In the approach, a set of predefined rules or decision criteria are defined of what constitutes compliant and non-compliant content (e.g., vector constraints). The rules are input into the meta-model 402, allowing the meta-model 402 to evaluate incoming content against the established criteria and make decisions accordingly. In some implementations, a hybrid approach combining machine learning and rule-based techniques can be used. For example, the meta-model 402 can use machine learning algorithms for pattern recognition and rule-based systems for domain-specific regulations.

Figure 5:
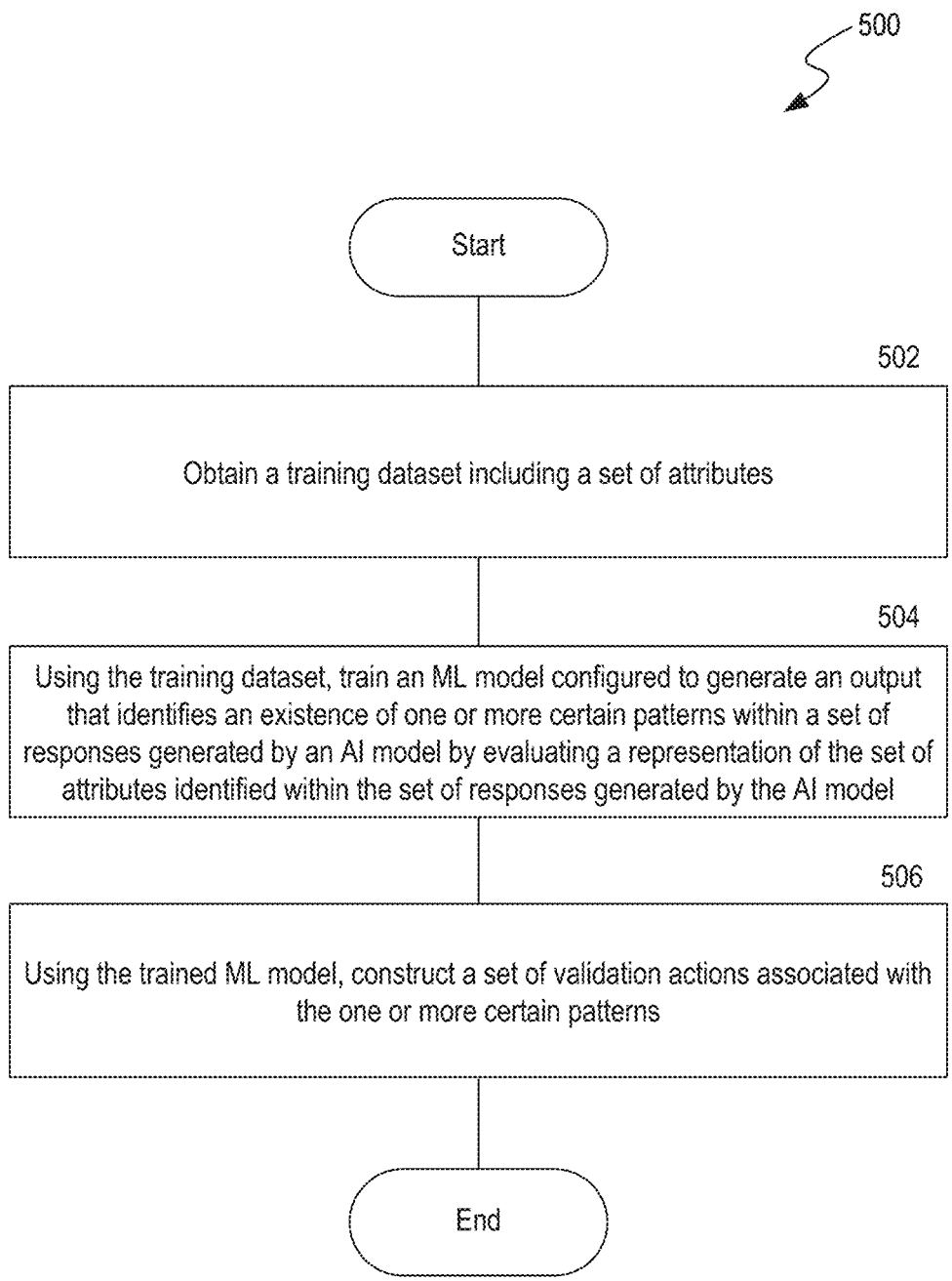
FIG. 5 is a flowchart depicting an example method of detecting certain patterns within an output of an AI model, in accordance with some implementations of the present technology.

FIG. 5 is a flowchart depicting an example method 500 of detecting certain patterns within an output of an AI model, in accordance with some implementations of the present technology. In some implementations, the process is performed by a computer system, e.g., example computer system 1300 illustrated and described in more detail with reference to FIG. 13. Particular entities, for example, AI application 106, 308 are illustrated and described in more detail with reference to FIGS. 1 and 3. Likewise, implementations can include different and/or additional steps or can perform the steps in different orders.

In operation 502, the system obtains a training dataset including a set of attributes. The attributes within the dataset represent various features or characteristics of the data that can be relevant to the detection of bias within the AI model. For example, in a hiring scenario, attributes can include candidate qualifications, experience, and demographic information. In a loan approval context, attributes can encompass factors such as income, credit score, and loan amount requested.

In some implementations, the training data is labeled data. Labeled data is annotated with ground truth labels or outcomes, providing explicit guidance for the learning algorithm during training. For example, in a dataset of loan application reviews, each entry with corresponding attributes (e.g., gender, financial income) can be labeled as either "biased" or "unbiased." In some implementations, the training data is unlabeled data. Unlabeled data lacks explicit annotations and requires the model to infer patterns and structures independently. For example, unlabeled data can include only the set of loan application reviews with the attributes, without being labeled as "biased" or "unbiased."

For data privacy reasons, synthetic data can be generated and used as the training dataset. Generative adversarial networks (GANs), which consist of two neural networks—a generator and a discriminator—can be trained iteratively to generate realistic-looking data samples. The generator network creates synthetic data samples from random noise or latent vectors. The generated samples are fed into the discriminator network, along with real data samples from the training dataset. The discriminator distinguishes between real and synthetic data samples. As the training progresses, both networks engage in a competitive process where the generator aims to produce increasingly realistic samples, while the discriminator becomes more adept at distinguishing between real and synthetic data. Through the iterative process, the generator network learns to generate synthetic data that closely matches the statistical properties and distribution of the real data. This enables the creation of synthetic data samples that exhibit similar patterns, features, and characteristics as the original dataset, without directly exposing sensitive information or violating privacy constraints.

In operation 504, using the training dataset, the system trains an ML model to generate an output that identifies an existence of certain patterns within a set of responses generated by an AI model. Further discussion of Artificial Intelligence and training methods are discussed in FIG. 12. The AI model, in response to a command set, generates the set of responses including a result (e.g., an outcome) and a set of descriptors associated with a series of steps to generate the result (e.g., an explanation). Examples of the AI model's responses are further discussed with reference to FIG. 1.

The ML model evaluates a representation of the set of attributes identified within the set of responses generated by the AI model. By extracting and evaluating the attributes, the ML model can be trained to recognize certain patterns associated with biased language or behavior within the training dataset. Each certain pattern represents a disproportionate association of one or more attributes of the set of attributes within the result and/or the set of descriptors associated with the series of steps to generate the result.

If the ML model is provided with labeled data as the training data, the ML model can, in some implementations, filter the attributes within the training dataset and identify the most informative attributes (e.g., certain patterns) for bias detection. For example, attributes such as gender and race can be more informative of the presence or absence of bias in a loan application context than attributes such as pet ownership status. Correlation, mutual information, and/or significance tests can be used to rank the attributes based on the discriminatory power. Correlation analysis measures the strength and direction of the linear relationship between each attribute and the target variable (in this case, the presence of bias). Attributes with higher correlation coefficients are considered more relevant for bias detection. For example, a correlation coefficient close to +1 indicates a strong positive linear relationship, while a coefficient close to −1 indicates a strong negative linear relationship. Mutual information estimation quantifies the amount of information shared between each attribute and the target variable, identifying attributes with higher mutual information as more informative for bias detection. Significance tests, such as t-tests or chi-squared tests, assess whether the distribution of each attribute significantly differs between biased and unbiased instances. Attributes with significant differences in distribution are deemed more discriminatory for bias detection. For example, if the p-value resulting from the significance test is below a predetermined threshold (e.g., 0.05), the p-value indicates that the observed differences are statistically significant, suggesting that the attribute is informative for bias detection. Once the attributes are ranked based on discriminatory power, the system selects only the most informative features to reduce the dimensionality of the dataset. By selecting only the most informative features, filter methods help reduce the dimensionality of the dataset, leading to faster processing times and improved model performance.

If the ML model is provided with unlabeled data as the training data, the ML model can use unsupervised learning techniques to identify patterns and structures within the training data. For example, clustering algorithms, which group similar instances based on shared characteristics, can be used to identify clusters of text passages that exhibit similar patterns of potentially biased language or behavior. Clustering algorithms such as k-means or hierarchical clustering can be applied to the unlabeled text data to group instances that share common attributes or features. The algorithms partition the data into clusters such that instances within the same cluster are more similar to each other than to instances in other clusters. By examining the contents of each cluster, the ML model can identify patterns indicative of bias, such as the frequent occurrence of certain words or phrases associated with biased language. Additionally, topic modeling, which identifies underlying themes or topics present in the text data can be used by the ML model to automatically identify topics within a corpus of text documents. Each topic represents a distribution over words, and documents are assumed to be generated from a mixture of the topics. By analyzing the topics inferred from the unlabeled data, the bias detection model can gain insights into the underlying themes or subjects that can be associated with bias.

Further, word embedding models such as Word2Vec or GloVe can be used to represent words in a continuous vector space, capturing semantic relationships between words. Further discussion of representing words in a continuous vector space is discussed in FIG. 6. During training, the word embedding model analyzes the co-occurrence patterns of words within the text corpus to learn the vector representations. Words that frequently appear together in similar contexts will be assigned vectors that are closer together in the vector space, while words that rarely co-occur or have different meanings will be farther apart. The model can capture semantic similarities and relationships between words, even if the words do not share explicit annotations or labels. Once trained, the word embeddings can be used by the ML model to identify words or phrases that are frequently associated with bias in the unlabeled training data. By examining the proximity or similarity of word vectors in the embedding space, the ML model can detect patterns indicative of biased language or behavior. For example, words with negative connotations or those commonly used to stereotype certain groups can cluster together in the vector space, providing insight into potential sources of bias within the text data.

In some implementations, the trained ML model detects certain patterns from the alphanumeric characters of the response in the AI model by analyzing the frequency of certain words or phrases, detecting syntactic structures, and/or identifying linguistic patterns indicative of bias. The presence of stereotypical language, discriminatory terms, or imbalanced representations of demographic groups within the alphanumeric characters can serve as potential indicators of bias.

By tallying the occurrence of words or phrases associated with biased language or discriminatory behavior, the ML model can identify potential patterns indicative of bias. For example, the disproportionate use of terms related to race, gender, or ethnicity can signal underlying biases embedded within the AI-generated responses. Through frequency analysis, the ML model can discern whether certain linguistic expressions occur more frequently in contexts associated with biased content. For example, if certain terms like "young," "elderly," or "single parent" occur more frequently in rejected loan applications compared to approved ones, the frequency disparity can signal potential bias based on age or family status.

The ML model can parse the textual data to identify grammatical relationships and structural patterns. For example, the model can analyze sentence structures, verb conjugations, or noun phrases to uncover nuances that can reveal biased language or unfair treatment. For example, if rejected applications tend to contain phrases like "low-income families struggle" or "single mothers face financial hardship" in the training dataset, while approved applications feature more neutral statements, such syntactic patterns can suggest underlying biases against specific socioeconomic groups.

Linguistic patterns indicative of bias within the alphanumeric characters, such as stereotypical portrayals, prejudiced attitudes, or discriminatory remarks can be identified. For example, the model can recognize recurrent patterns of language that stereotype certain demographic groups or perpetuate negative stereotypes. By detecting such patterns, the model can flag instances of biased content and contribute to the mitigation of discriminatory behavior in AI-generated responses. For example, if there is a trend where rejected applications often mention factors like "credit score" or "employment history" in a negative context in the explanation of the training dataset, implying bias against individuals with less favorable financial backgrounds, whereas approved applications consistently highlight positive attributes like "steady income" or "strong credit history," the patterns can reveal biases in the AI model's decision-making process.

The system can segment the alphanumeric characters of the set of responses generated by an AI model into individual tokens or units of meaning. For example, words, phrases, or punctuation marks can be identified as distinct tokens within the responses. By tokenizing the alphanumeric characters, the system creates a structured representation of the textual data, allowing for subsequent analysis and feature extraction. The responses can be normalized by, for example, stripping suffixes or prefixes from words to derive the words' base or root forms, or map words to corresponding canonical or dictionary forms. The techniques help standardize the representation of words within the responses, reducing redundancy and improving the efficiency of pattern detection.

In operation 506, using the trained ML model, the system constructs a set of validation actions associated with certain patterns. Each validation action maps to a specific scenario derived from certain patterns and tests the existence of certain patterns within the result and/or the set of descriptors of the AI model. Each validation action includes (1) a command set, (2) an expected result, and (3) an expected set of descriptors associated with an expected series of steps to generate the expected result. Example methods of identifying relevant validation actions from previously stored validation actions are discussed further in FIG. 8. In some implementations, the platform ML model does not categorize identified biases or distinguish between different types of biases (e.g., training bias, algorithmic bias, cognitive bias). Rather, patterns (e.g., frequency-related, syntactic, linguistic) that are identified through the validation actions are flagged as potential bias. Methods of validating the AI-generated responses against the guidelines (e.g., vector constraints 102) by creating validation actions are discussed in further detail in FIGS. 1, 9, and 10.

The system can define a command set tailored to elicit responses from the AI model that encapsulates the presence or absence of the identified alphanumeric character patterns in operation 504. For example, if a pattern indicative of biased language is detected in the training dataset (e.g., if all approved loan applications state "He has strong financial credentials," and never "She has strong financial credentials"), a corresponding command set can prompt the AI model to generate a response that either exhibits or lacks the specific linguistic bias (e.g., "Generate an indicator of the strength of the applicant's financial credentials using gender-specific language"). The command set serves as a standardized instruction guiding the AI model's behavior during the validation process. The identified certain patterns can be decomposed into the patterns' constituent elements, whether the patterns are alphanumeric characters, words, phrases, or structural features. For certain patterns that follow predictable rules or templates, a rule-based approach can be employed to generate command sets automatically. Rules are defined based on the observed patterns, and commands are generated programmatically according to the rules. For example, if a bias pattern involves specific keyword combinations, rules can be defined to generate commands containing the keywords in various contexts.

Command sets can be generated adaptively based on feedback from previous testing iterations. Machine learning algorithms can analyze the effectiveness of previous commands and adjust the generation process dynamically to optimize testing efficiency and accuracy. For example, commands that consistently yield informative responses can be prioritized, while less effective commands can be refined or replaced. The adaptive approach ensures that the command sets evolve over time to effectively capture and test against emerging patterns or variations in the data.

In some implementations, the ML model generates a confidence score associated with a likelihood of the existence of the certain patterns within the set of responses generated by the AI model. The confidence score is represented as an alphanumeric value ranging from 0 to 1, where higher values indicate a higher likelihood of the identified patterns being present in the responses. The ML model can output a binary indicator, represented by alphanumeric characters such as "0" or "1", where "1" signifies the presence of certain patterns with high confidence, and "0" indicates an absence or uncertainty. The system can express the confidence score as a categorical variable, using alphanumeric labels such as "low", "medium", or "high" to indicate different levels of confidence in the existence of the identified patterns. The ML model can produce a probabilistic distribution over multiple classes or categories, represented by alphanumeric characters corresponding to the probabilities assigned to each class. For example, a confidence score of "0.8" can signify an 80% probability of certain patterns being present, while "0.2" indicates a 20% probability.

In some implementations, the ML model can identify new patterns within the result and/or the set of descriptors of the AI model, and iteratively update the set of validation actions based on the new patterns. Once new patterns are identified, the ML model can evaluate the significance and relevance to the validation process. The ML model determines whether the patterns necessitate the creation of new validation actions or modifications to existing ones. The update to the validation actions can involve creating new validation actions tailored to address specific patterns or refining existing actions to better capture the nuances of the identified patterns. The iterative process continues as the ML model periodically reviews the outcome and descriptors of the AI model to identify additional patterns and refine the validation actions accordingly. By iteratively updating the set of validation actions, the ML model ensures that the validation process remains dynamic and responsive to the evolving characteristics of the AI model's responses.

In some implementations, the ML model receives an indicator of a type of application associated with the AI model. The ML model, or another intermediate AI model, can identify a relevant set of attributes associated with the type of application defining the operation boundaries of the AI model. To identify a relevant set of attributes associated with the type of application, the ML model can use techniques tailored to the unique characteristics of the application domain or rely on pre-defined sets of attributes curated for different types of applications (e.g., through industry standards). The ML model can obtain the relevant set of attributes via an Application Programming Interface (API) based on the type of application of the AI model. For example, in an AI model designed to assess loan applications. In the scenario, the ML model can use an Application Programming Interface (API) provided by financial institutions or credit bureaus and access a relevant set of attributes typically associated with loan applications, such as income, employment status, credit history, debt-to-income ratio, and loan amount requested. In some implementations, rather than relying solely on an API, the ML model can utilize web scraping techniques to extract attribute data from online sources such as databases, websites, or other repositories.

Figure 6:
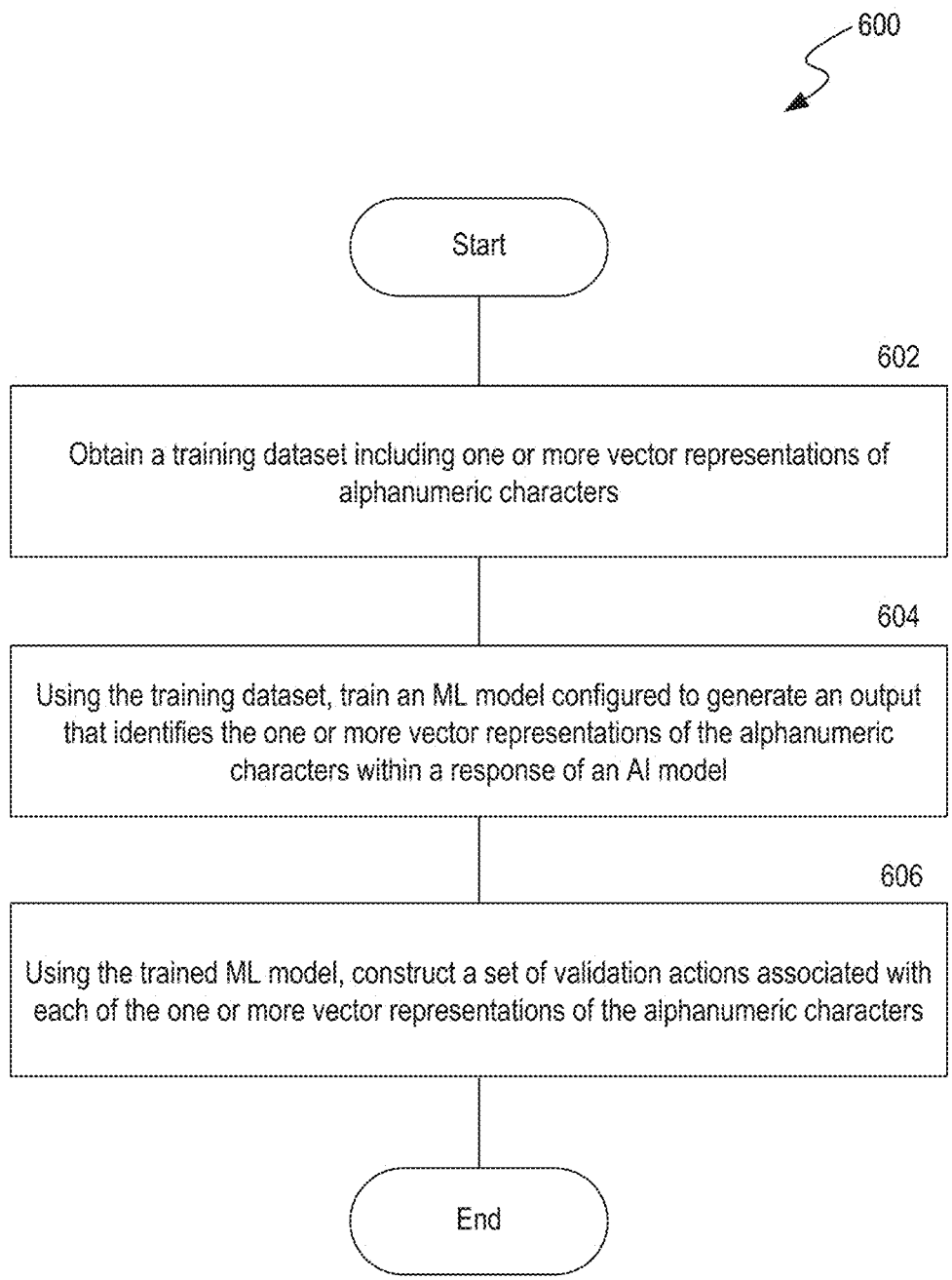
FIG. 6 is a flowchart depicting an example method of detecting vector representations within an output of an AI model, in accordance with some implementations of the present technology.

FIG. 6 is a flowchart depicting an example method 600 of detecting vector representations within an output of an AI model, in accordance with some implementations of the present technology. In some implementations, the process is performed by a computer system, e.g., example computer system 1300 illustrated and described in more detail with reference to FIG. 13. Particular entities, for example, AI application 106, 308 are illustrated and described in more detail with reference to FIGS. 1 and 3. Likewise, implementations can include different and/or additional steps or can perform the steps in different orders.

In operation 602, the system obtains a training dataset including vector representations of alphanumeric characters. The vector representations can encode the alphanumeric characters into numerical format, allowing the system to process and analyze the vector representations using mathematical operations. To create vector representations of alphanumeric characters, the system can map each alphanumeric character to a dense vector space where semantic similarities between characters are preserved. By leveraging the context of neighboring characters, embeddings capture nuanced relationships between alphanumeric characters. For example, the alphanumeric characters are encoded into vectors using word embeddings. Word embeddings, such as Word2Vec or GloVe, learn vector representations of words based on the word's contextual usage in a large corpus of text data. Each word is represented by a vector in a high-dimensional space, where similar words have similar vector representations.

In some implementations, character-level embeddings designed for alphanumeric characters can be used to focus on the characters themselves rather than entire words for short text sequences. To create character-level embeddings, the system can assign a unique vector to each alphanumeric character in the training dataset. Convolutional neural networks (CNNs) or recurrent neural networks (RNNs) can be used, where CNN-based approaches apply a series of convolutional filters over the input characters to extract local features, while RNNs process the characters sequentially to capture contextual information. Both architectures can effectively learn representations of individual characters based on the surrounding context. Character-level embeddings can also incorporate subword information, such as character n-grams (e.g., a sequence of n-words) or morphemes (e.g., the smallest meaningful constituent of a linguistic expression, such as "un," "break," "able" for the word "unbreakable"). By considering the smaller units of text, the embeddings can capture more complex linguistic patterns and improve performance, especially for tasks involving rare or out-of-vocabulary words.

In some implementations, the training data is labeled data. Further discussion of labeled training data is detailed with reference to FIG. 5. For example, a labeled dataset for toxic language detection can include comments from social media platforms or online forums, where each comment, word, and/or phrase is annotated as either "toxic" or "non-toxic" based on its content. In some implementations, the training data is unlabeled data. Unlabeled data lacks explicit annotations and requires the model to infer patterns and structures independently. For example, unlabeled data can include website articles, blog posts, or customer reviews, without any guidance on whether the content is toxic or harmful. For data privacy reasons, synthetic data can be generated and used as the training dataset. Further discussion of generating synthetic data is detailed with reference to FIG. 5.

In operation 604, using the training dataset, the system trains an ML model to generate an output that identifies the vector representations of the alphanumeric characters within a response of an AI model. The AI model, in response to a command set, generates the set of responses including a result (e.g., an outcome) and a set of descriptors associated with a series of steps to generate the result (e.g., an explanation). Examples of the AI model's responses are further discussed with reference to FIG. 1.

To train the ML model, neural network architectures such as convolutional neural networks (CNNs) or recurrent neural networks (RNNs) can be used to process sequences of the training data received in operation 602. During the training process, the ML model adjusts its parameters iteratively to minimize the discrepancy between the predicted vector representations and the ground truth representations provided by the training dataset. Further discussion of Artificial Intelligence and training methods for both labeled data and unlabeled data are discussed in FIGS. 5 and 12. Certain alphanumeric characters or combinations of characters can exhibit higher frequencies in responses containing toxic and/or harmful language compared to non-toxic and/or non-harmful responses. For example, profanity or derogatory terms can appear more frequently in toxic responses, so the ML model can flag AI model responses containing the certain alphanumeric characters or combinations of characters as harmful.

Once the ML model is trained, the model can receive responses generated by the AI model in response to a given command set. The responses of the AI model can contain alphanumeric characters, and the ML model can identify the vector representations associated with each character within the response. By evaluating the vector representations of alphanumeric characters from the response, the system can detect patterns associated with toxic language.

To identify the vector representations, the system can evaluate the proximate locations of the alphanumeric characters within the response of the AI model. To evaluate the proximate locations of alphanumeric characters within the response of the AI model, the system can use tokenization and/or positional encoding. The response from the AI model can be tokenized into individual alphanumeric characters, each character as a discrete unit in the sequence. The characters are encoded into vector representations in methods described further in this figure with reference to the training dataset. Once the response is tokenized and encoded into vector representations, the system can analyze the vectors to evaluate the proximate locations of alphanumeric characters. Evaluating the proximate location allows the model to discern the proximity of characters in the sequence and learn contextual relationships between neighboring characters. For example, the system can calculate pairwise distances between vectors or measure similarity scores based on vector representations. By considering the distances or similarities between vectors, the system can infer the spatial relationships and proximities between characters within the sequence. The ML model can compute the distance between every pair of vectors in the dataset. Various distance metrics can be used, such as Euclidean distance, Manhattan distance, or cosine similarity. Euclidean distance measures the straight-line distance between two points in the vector space, while Manhattan distance calculates the distance along the axes. Cosine similarity measures the cosine of the angle between two vectors, indicating the similarity in the vectors' directions. In some implementations, the ML model uses temporal dependencies between the alphanumeric characters to evaluate the proximate locations of the alphanumeric characters within the response of the AI model by considering the order and timing of the appearance of the alphanumeric characters within the response.

To identify the vector representations, the system can evaluate the frequency of the alphanumeric characters within the response of the AI model. Term Frequency-Inverse Document Frequency (TF-IDF) encoding calculates the importance of a word relative to the word's frequency in the entire training dataset. For example, if the response contains the alphanumeric characters "abcdeabc", the system counts the occurrences of each character: 'a' appears twice, 'b' appears twice, 'c' appears twice, 'd' appears once, and 'e' appears once. The system can assign specific weights to words that are more indicative of harmful language (e.g., profanity). Assigning weights prioritizes the importance of the characters in the vector representations, enabling the system to prioritize identifying toxic and/or harmful language based on the presence and frequency of the characters.

To identify the vector representations, the system can evaluate an association between the alphanumeric characters within the response of the AI model. Alphanumeric characters that commonly appear in toxic responses can exhibit distinct patterns in the characters' vector representations with other vector representations compared to non-toxic responses. For example, in the vector space, certain alphanumeric characters associated with toxic language can cluster together, forming distinct regions that differentiate the clusters from characters in non-toxic responses. The clusters can reflect semantic relationships or contextual associations specific to toxic language usage. By evaluating the spatial arrangement of vector representations, the system can identify the patterns and use them as indicators to classify responses as toxic or non-toxic.

In operation 606, using the trained ML model, the system constructs a set of validation actions associated with each of the vector representations of the alphanumeric characters. Each validation action tests the presence or absence of the vector representations of the alphanumeric characters within the result and/or the set of descriptors of the AI model. Each validation action maps to a specific use-case derived from the vector representations of the alphanumeric characters. Each validation action includes (1) a command set, (2) an expected result, and (3) an expected set of descriptors associated with an expected series of steps to generate the expected result. Example methods of identifying relevant validation actions from previously stored validation actions are discussed further in FIG. 8.

For example, the system can establish thresholds for certain attributes or features extracted from the vector representations, such as the magnitude or direction of the vectors. If a vector representation exceeds or falls below a predefined threshold (e.g., indicating harmful language), the system can trigger specific validation actions to address non-compliance. In some implementations, the system can classify the vector representations into different categories or classes (e.g., "profanity," "hate speech," "harassment") that map to different validation actions. Based on the classification results, the system can assign appropriate validation actions to each category of vector representations. For example, the system can use clustering to group similar vector representations together. Clustering algorithms can identify clusters of vector representations that share common characteristics or patterns, allowing the system to define validation actions tailored to each cluster.

In some implementations, the set of validation actions constructed by the trained ML model is ordered based on the complexity of the use-cases derived from the vector representations of the alphanumeric characters. For example, subsequently constructed validation actions are progressively more complex than preceding validation actions. The validation actions can be ordered by analyzing the vector representations of the alphanumeric characters and identifying the underlying complexity of each representation. Certain representations can capture simple patterns or straightforward use-cases, while others can involve more intricate relationships or dependencies between characters. For example, simpler validation actions can focus on detecting explicit keywords or phrases commonly associated with toxicity (e.g., profanity). On the other hand, more complex validation actions (e.g., harassment) can involve analyzing the context in which certain words or phrases appear and identifying subtle nuances that contribute to the overall toxicity of the language. For example, the system can consider the tone, intent, and underlying sentiment of the response to determine whether the response contains toxic elements. The system can assign a complexity score to each validation action, enabling the system to order the validation actions in a logical sequence.

In some implementations, the ML model weighs the identified vector representations of the alphanumeric characters within the response of the AI model based on predetermined weights corresponding with each of the identified vector representations of the alphanumeric characters. The output can include an overall score in accordance with the weighted vector representations of the alphanumeric characters. The system can use a threshold mechanism to determine whether the overall score indicates the presence or absence of certain characteristics or patterns (e.g., toxicity) within the response. For example, if the score exceeds a predefined threshold, the system can classify the response accordingly. There can be multiple thresholds corresponding to different compliance indicators. For example, there can be a threshold for "compliant," "partially compliant," and "non-compliant."

Figure 7:
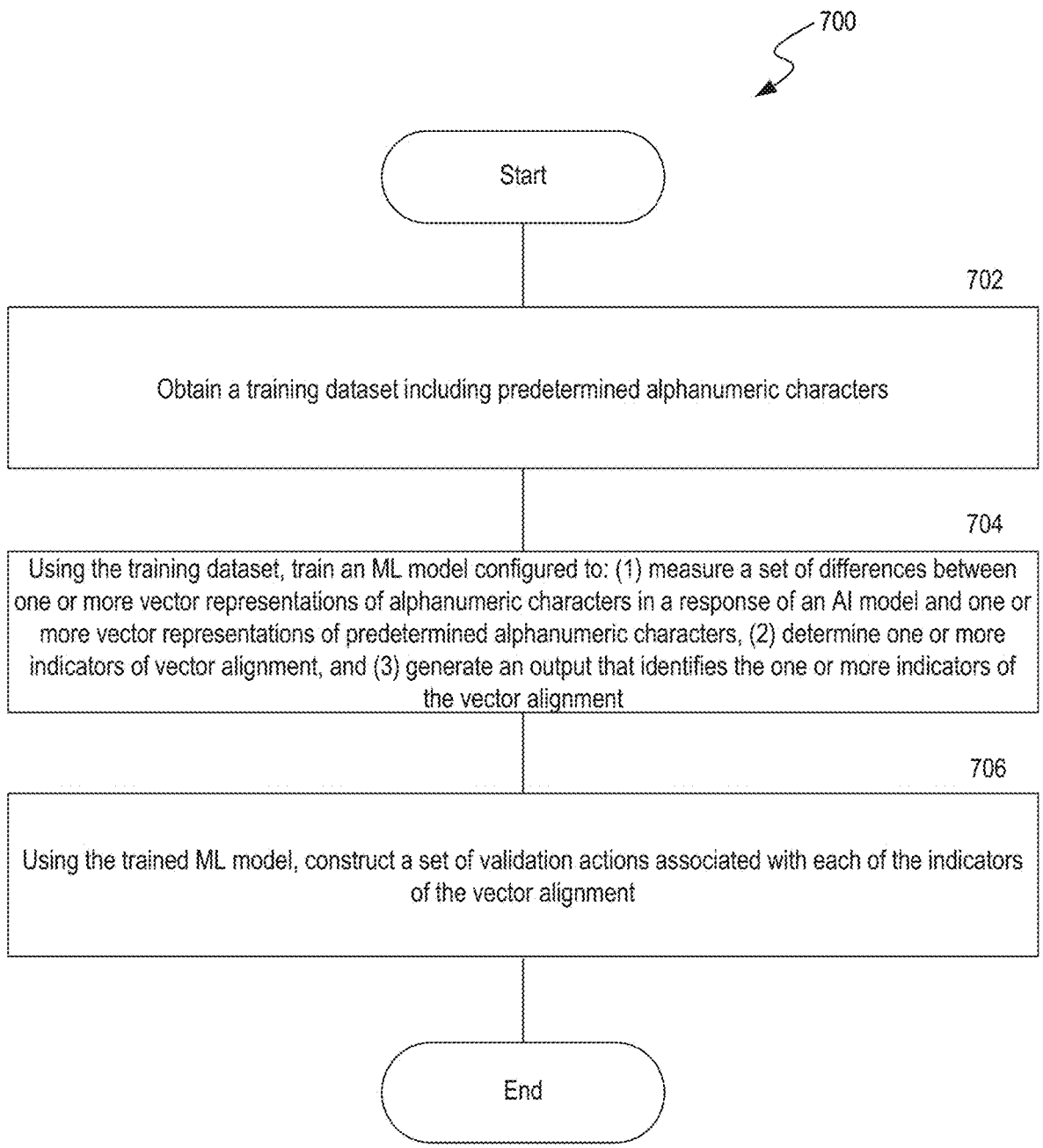
FIG. 7 is a flowchart depicting an example method of detecting indicators of vector alignment within an output of an AI model, in accordance with some implementations of the present technology.

FIG. 7 is a flowchart depicting an example method 700 of detecting indicators of vector alignment within an output of an AI model, in accordance with some implementations of the present technology. In some implementations, the process is performed by a computer system, e.g., example computer system 1300 illustrated and described in more detail with reference to FIG. 13. Particular entities, for example, AI application 106, 308 are illustrated and described in more detail with reference to FIGS. 1 and 3. Likewise, implementations can include different and/or additional steps or can perform the steps in different orders.

In operation 702, the system obtains a training dataset including predetermined alphanumeric characters. The dataset can be indicative of IP violations, such as copyrighted text and/or trademarked text commonly associated with intellectual property infringement. The training dataset can be a list of IP-protected text obtained from authoritative sources, legal databases, or intellectual property registries. The training dataset can include copyrighted excerpts from literary works, trademarked slogans or logos, patented phrases, or other textual content with recognized intellectual property rights. The training dataset can be constructed by scraping publicly available sources, such as websites, online marketplaces, or social media platforms, where instances of IP violations are frequently observed. Web scraping tools can be employed to extract alphanumeric text from the sources, filtering for content that matches known IP-protected text.

In some implementations, the predetermined alphanumeric characters can be encoded into vector representations. Further discussion of encoding alphanumeric characters into vector representations is detailed with reference to FIG. 6.

In some implementations, the training data is labeled data. Further discussion of labeled training data is detailed with reference to FIG. 5. For example, a labeled dataset for IP violation detection can include words or phrases labeled as either "IP infringement" or "non-infringing" based on the presence or absence of copyrighted and/or trademarked content. In some implementations, the training data is unlabeled data. Unlabeled data lacks explicit annotations and requires the model to infer patterns and structures independently. For example, unlabeled data can include text data, but without explicit annotations indicating which descriptions include copyrighted text and/or trademarked terms or logos. For data privacy reasons, synthetic data can be generated and used as the training dataset. Further discussion of generating synthetic data is detailed with reference to FIG. 5.

In operation 704, using the training dataset, the system trains an ML model. The ML model can be trained to measure a set of differences in the direction or magnitude between vector representations of alphanumeric characters in a response of an AI model and vector representations of predetermined alphanumeric characters. Further discussion of Artificial Intelligence and training methods are discussed in FIG. 12. The AI model, in response to a command set, generates the set of responses including a result (e.g., an outcome) and a set of descriptors associated with a series of steps to generate the result (e.g., an explanation). Examples of the AI model's responses are further discussed with reference to FIG. 1. The ML model can be trained to generate an output that identifies the indicators of the vector alignment associated with the vector representations of the alphanumeric characters within the response of the AI model.

To measure differences in the direction or magnitude between vector representations of alphanumeric characters, the ML model can calculate the angular and/or distance disparities between the vectors associated with the alphanumeric characters present in the response generated by the AI model and those predefined in the training dataset. The ML model can compute the cosine similarity or cosine distance between the vector representations. Cosine similarity measures the cosine of the angle between two vectors and provides a value ranging from −1 to 1, where a higher value indicates greater similarity. Conversely, cosine distance quantifies the dissimilarity by subtracting the cosine similarity from 1, yielding a range from 0 to 2, where lower values indicate closer alignment. The greater the similarity, the more likely the AI model's response is infringing on IP rights. Additionally, the model can compute Euclidean distance or other distance metrics to evaluate the spatial separation between vector representations. Euclidean distance measures the straight-line distance between two vectors in multidimensional space, providing a scalar value representing the length of the shortest path between the vectors. By comparing the Euclidean distances between the vectors in the response and the predetermined set, the ML model identifies discrepancies in both direction and magnitude. The lower the discrepancy, the more likely the AI model's response is infringing on IP rights.

The ML model can be trained to determine indicators of vector alignment based on whether a volume of the set of differences between vector representations of alphanumeric characters in a response of an AI model and vector representations of predetermined alphanumeric characters satisfies a predetermined threshold. The volume represents the overall magnitude or extent of misalignment between the vectors. The ML model can compute the differences in direction or magnitude for each pair of corresponding vectors in the response and the predetermined set and aggregate the differences to determine the volume. In some implementations, the ML model can evaluate the average or total magnitude of differences across all vectors, providing a comprehensive measure of alignment across the entire response. By aggregating the individual discrepancies, the model gains insights into the overall alignment patterns present in the response. In some implementations, the ML model establishes a predetermined threshold to classify alignment indicators. The threshold serves as a reference point for determining whether the observed volume of differences exceeds an acceptable level. If the calculated volume surpasses the threshold, the model identifies the presence or absence of misalignment and flags the response as an indicator of potential issues or deviations. The ML model can adaptively adjust the threshold based on historical data or feedback from previous analyses.

In some implementations, the response includes unstructured alphanumeric characters. The ML model can extract the predetermined alphanumeric characters from the unstructured alphanumeric characters by identifying and isolating the predetermined alphanumeric characters from surrounding unstructured alphanumeric characters. For example, if the ML model is looking for specific alphanumeric sequences representing trademarked phrases, the ML model can search for exact matches of those sequences within the unstructured data.

In operation 706, using the trained ML model, the system constructs a set of validation actions associated with each of the indicators of the vector alignment. Each validation action maps to a specific use-case derived from the indicators of the vector alignment and tests the presence or absence of the indicators of the vector alignment within the result and/or the set of descriptors of the AI model. Each validation action includes (1) a command set, (2) an expected result, and (3) an expected set of descriptors associated with an expected series of steps to generate the expected result. Example methods of identifying relevant validation actions from previously stored validation actions are discussed further in FIG. 8.

In some implementations, the validation actions are defined based on the presence or absence of certain alignment indicators within the vector representations of alphanumeric characters that are indicative of IP-protected content. For example, certain patterns or characteristics in the vector representations can strongly correlate with copyrighted text or trademarked phrases commonly associated with IP violations. The system can design validation actions to test for the presence or absence of the patterns in the responses generated by the AI model. In some implementations, the system can use a probabilistic approach, where the ML model assigns likelihood scores to different alignment indicators based on the observed frequency and significance in relation to IP infringement. Validation actions can be tailored to test for the presence or absence of alignment indicators with high likelihood scores, indicating a higher probability of IP violation. The system can consider the complexity and diversity of alignment indicators identified by the ML model in relation to IP infringement. For example, if the ML model identifies multiple types of alignment indicators associated with different forms of IP violations (e.g., copyrighted text, trademarked phrases), the system can prioritize validation actions based on the relative importance of the indicators in detecting IP infringement.

In some implementations, the set of validation actions constructed by the trained ML model is categorized based on a type of indicator of vector alignment. The type of the indicator of the vector alignment can include complete alignment, partial alignment, and/or misalignment. For example, if the ML model identifies vector representations that closely match known instances of copyrighted text or trademarked phrases, the alignment indicators can be classified as indicating complete alignment with IP-protected content. Alternatively, the system can categorize alignment indicators as representing partial alignment if the vector representations exhibit some similarities or overlaps with patterns associated with IP infringement but do not fully match predefined criteria for complete alignment. For example, if certain vector representations display similarities with copyrighted text but also contain variations or deviations, the vector representations can be classified as indicating partial alignment with IP-protected content. The system can identify alignment indicators that deviate significantly from predetermined patterns or characteristics associated with IP infringement, indicating misalignment with IP-protected content. For example, if the ML model detects vector representations that diverge substantially from known instances of copyrighted text or trademarked phrases, the alignment indicators can be categorized as indicating misalignment with IP-protected content. In some implementations, complete alignment indicators can be prioritized in validation actions aimed at identifying clear-cut instances of IP violation, while partial alignment and misalignment indicators can be targeted in cases where the boundaries between infringing and non-infringing content are less clear.

In some implementations, the system can evaluate (1) the proximate locations of the alphanumeric characters within the response of the AI model, (2) the frequency of the alphanumeric characters within the response of the AI model, and/or (3) an association between the alphanumeric characters within the response of the AI model. Further evaluation techniques are discussed with reference to FIG. 6.

The system can receive an indicator of a type of application associated with the AI model. The system identifies a relevant set of predetermined alphanumeric characters associated with the type of application defining one or more operation boundaries of the AI model. The system can obtain the relevant set of predetermined alphanumeric characters via an Application Programming Interface (API). Further methods of defining a type of application of the AI model are discussed with reference to FIG. 5.

Figure 8:
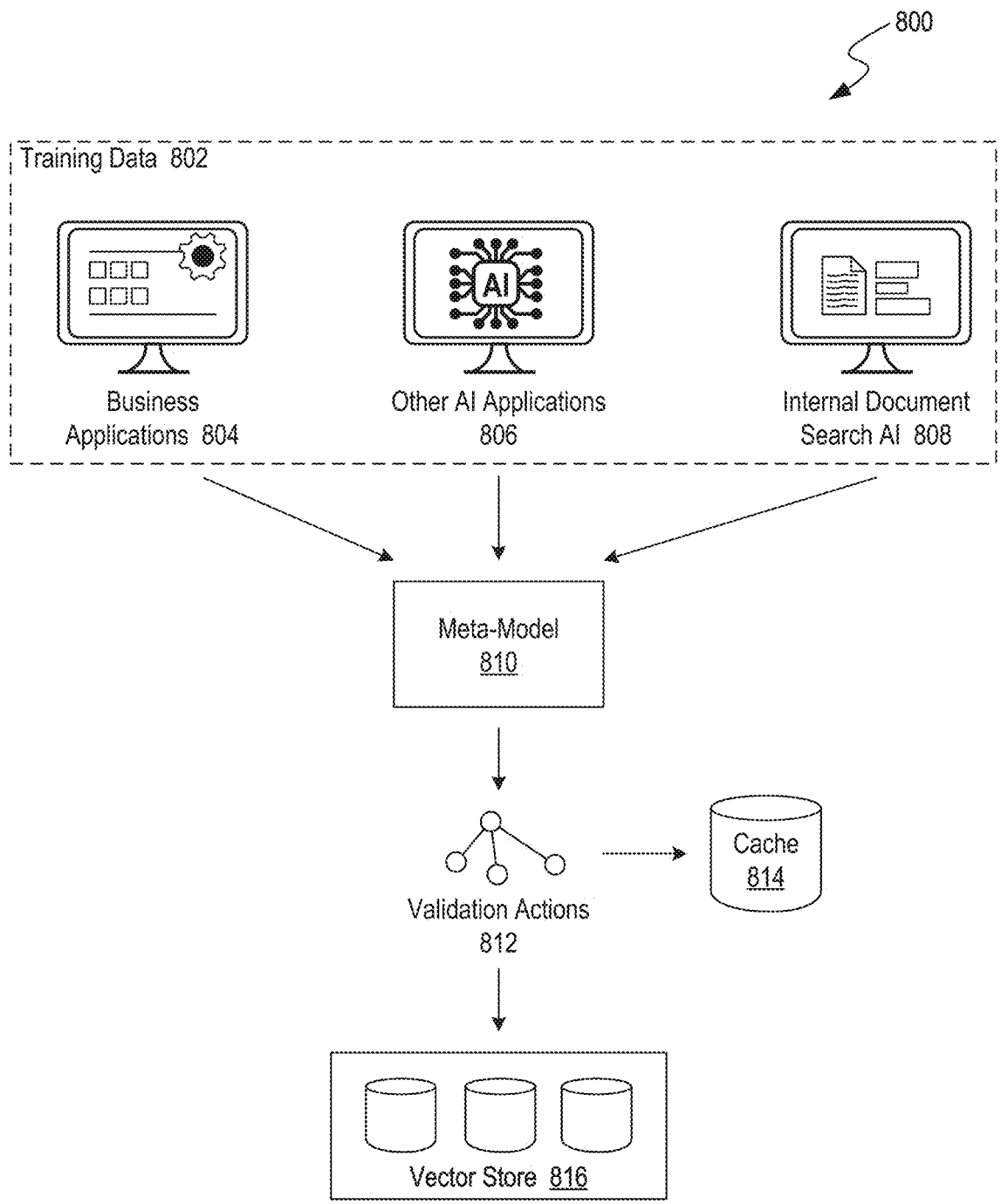
FIG. 8 is a block diagram illustrating an example environment for generating validation actions to determine AI model compliance, in accordance with some implementations of the present technology.

FIG. 8 is a block diagram illustrating an example environment 800 for generating validation actions to determine AI model compliance, in accordance with some implementations of the present technology. Environment 800 includes training data 802, meta-model 810, validation actions 812, cache 814, and vector store 816. Meta-model 810 is the same as or similar to meta-model 402 illustrated and described in more detail with reference to FIG. 4. Meta-model 810 is implemented using components of example computer system 1300 illustrated and described in more detail with reference to FIG. 13 and/or the validation engine 104 and validation engine 212 illustrated and described in more detail with reference to FIGS. 1 and 2 respectively. Likewise, implementations of example environment 800 can include different and/or additional components or can be connected in different ways.

The training data includes data from sources such as business applications 804, other AI applications 806, and/or an internal document search AI 808. Business applications 804 refer to software tools or systems used to facilitate various aspects of business operations and can include data related to, for example, loan transaction history, customer financial profiles, credit scores, and income verification documents. For example, data from a banking application can provide insights into an applicant's banking behavior, such as average account balance, transaction frequency, and bill payment history. Other AI applications 806 can include, for example, credit scoring models, fraud detection algorithms, and risk assessment systems that can be used by lenders to evaluate loan applications. Data from AI applications 806 refer to various software systems that utilize artificial intelligence (AI) techniques to perform specific tasks or functions. The data can include credit risk scores and fraud risk indicators. For example, an AI-powered credit scoring model can provide a risk assessment score based on an applicant's credit history, debt-to-income ratio, and other financial factors. The internal document search AI 808 is an AI system tailored for searching and retrieving information from internal documents within an organization. For example, the internal document search AI 808 can be used to retrieve and analyze relevant documents such as loan agreements, regulatory compliance documents, and internal policies. Data from internal documents can include, for example, legal disclosures, loan terms and conditions, and compliance guidelines. For example, the AI system can flag loan applications that contain discrepancies or inconsistencies with regulatory guidelines or internal policies.

The training data 802 is fed into the meta-model 810 to train the meta-model 810, enabling the meta-model 810 to learn patterns and characteristics associated with compliant and non-compliant AI behavior. Further discussion of Artificial Intelligence and training methods are discussed in FIGS. 5-7 and FIG. 12. The meta-model 810 leverages the learned patterns and characteristics to generate validation actions 812, which serve as potential use-cases designed to evaluate AI model compliance. The validation actions 812 can encompass various scenarios and use cases relevant to the specific application domain of the AI model under assessment. Further methods of creating validation actions are discussed in FIGS. 5-7.

In some implementations, the generated validation actions 812 can be stored in a cache 814 and/or a vector store 816. The cache 814 is a temporary storage mechanism for storing recently accessed or frequently used validation actions, and facilitates efficient retrieval when needed. On the other hand, the vector store 816 provides a structured repository for storing vector representations of validation actions, enabling efficient storage and retrieval based on similarity or other criteria. The vector store 816 stores the generated validation actions 812 in a structured and accessible format (e.g., using distributed databases or NoSQL stores), which allows for efficient retrieval and utilization by the meta-model 810. The generated validation actions 812 can be preprocessed to remove any irrelevant information, standardize the format, and/or organize the generated validation actions 812 into a structured database schema. Once the generated validation actions 812 are prepared, the generated validation actions 812 can be stored in a vector store 816 using distributed databases or NoSQL stores.

In some implementations, the generated validation actions 812 are stored using graph databases such as Neo4j™ or Amazon Neptune™. Graph databases represent data as nodes and edges, allowing for the modeling of relationships between generated validation actions 812 to demonstrate the interdependencies. In some implementations, the generated validation actions 812 are stored in a distributed file system such as Apache Hadoop™ or Google Cloud Storage™. The systems offer scalable storage for large volumes of data and support parallel processing and distributed computing. Generated validation actions 812 stored in a distributed file system can be accessed and processed by multiple nodes simultaneously, which allows for faster retrieval and analysis by the meta-model 810.

The vector store 816 can be stored in a cloud environment hosted by a cloud provider, or a self-hosted environment. In a cloud environment, the vector store 816 has the scalability of cloud services provided by platforms (e.g., AWS™, Azure™). Storing the vector store 816 in a cloud environment entails selecting the cloud service, provisioning resources dynamically through the provider's interface or APIs, and configuring networking components for secure communication. Cloud environments allow the vector store 816 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 816 is stored on a private web server. Deploying the vector store 816 in a self-hosted environment entails setting up the server with the necessary hardware or virtual machines, installing an operating system, and storing the vector store 816. In a self-hosted environment, organizations have full control over the vector store 816, allowing organizations to implement customized security measures and compliance policies tailored to the organization's specific needs. For example, organizations in industries with strict data privacy and security regulations, such as finance institutions, can mitigate security risks by storing the vector store 816 in a self-hosted environment.

The meta-model 810 accesses the generated validation actions 812 from the vector store 816 to initiate the compliance assessment. The system can establish a connection to the vector store 816 using appropriate APIs or database drivers. The connection allows the meta-model 810 to query the vector store 816 and retrieve the relevant vector constraints for the AI application under evaluation. Frequently accessed validation actions 812 are stored in memory, which allows the system to reduce latency and improve response times for compliance assessment tasks.

In some implementations, only the relevant validation actions are retrieved based on the specific AI application under evaluation. For example, metadata tags, categories, or keywords associated with the AI application can be used to filter the validation actions 812. The relevant validation actions can be specifically selected based on the specific context and requirements of the AI application being evaluated. For example, the system analyzes metadata tags, keywords, or categories associated with the validation actions 812 stored in the system's database. Using the specific context and requirements of the AI application, the system filters and retrieves the relevant validation actions from the database.

Various filters can be used to select relevant validation actions. In some implementations, the system uses natural language processing (NLP) to parse through the text of the validation action 812 and identify key terms, phrases, and clauses that denote regulatory obligations relevant to the AI application's domain. The specific terms related to the AI application's domain can be predefined and include, for example, "patient privacy" for healthcare sector applications. Using the specific terms related to the AI application's domain as a filter, the system can filter out the non-relevant validation actions. To identify the relevant validation actions from the validation actions 812, the system can determine the specific terms to use as filters by calculating the similarity between vectors representing domain-specific terms (e.g., "healthcare") and vectors representing other terms related to the domain (e.g., "patient privacy"), domain-specific terms can be identified based on the proximity of the other terms to known terms of interest. A similarity threshold can be applied to filter out terms that are not sufficiently similar to known domain-specific terms.

In some implementations, the system can tag relevant validation actions with attributes that help contextualize the relevant validation actions. The tags serve as markers that categorize and organize the validation actions 812 based on predefined criteria, such as regulatory topics (e.g., data privacy, fairness, transparency) or jurisdictional relevance (e.g., regional regulations, industry standards). The tags provide a structured representation of the validation actions 812 and allow for easier retrieval, manipulation, and analysis of regulatory content. The tags and associated metadata can be stored in a structured format, such as a database, where each validation action 812 is linked to the validation action's 812 corresponding tags and/or regulatory provisions.

The meta-model 810 evaluates the AI application's compliance with the vector constraints through the use of validation actions 812 (e.g., using semantic search, pattern recognition, and machine learning techniques). Further evaluation methods in determining compliance of AI applications are discussed with reference to FIGS. 5-7.

Figure 9:
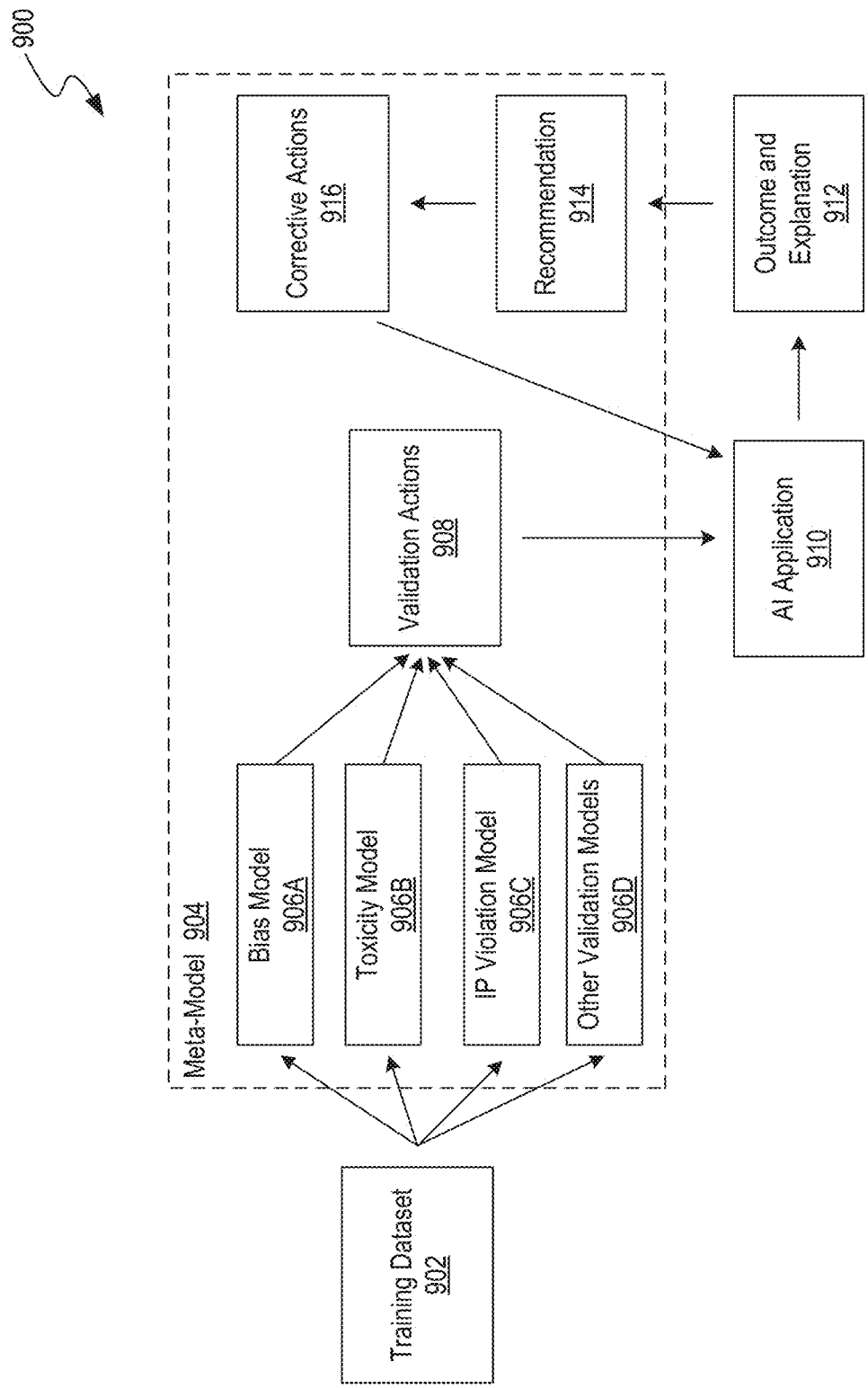
FIG. 9 is a block diagram illustrating an example environment for automatically implementing corrective actions on the AI model, in accordance with some implementations of the present technology.

FIG. 9 is a block diagram illustrating an example environment 900 for automatically implementing corrective actions on the AI model, in accordance with some implementations of the present technology. Environment 900 includes training dataset 902, meta-model 904 (which includes validation models 906A-D, validation actions 908, AI application 910), outcome and explanation 912, recommendation 914, and corrective actions 916. Meta-model 904 is the same as or similar to meta-model 402 and meta-model 810 illustrated and described in more detail with reference to FIGS. 4 and 8, respectively. Meta-model 904 and AI application 910 are implemented using components of example computer system 1300 illustrated and described in more detail with reference to FIG. 13. Likewise, implementations of example environment 900 can include different and/or additional components or can be connected in different ways.

A training dataset 902, which includes a collection of data used to train machine learning models, is input into the meta-model 904. The meta-model 904 is a comprehensive model that encompasses multiple sub-models tailored to address specific aspects of AI compliance. Further evaluation techniques in determining the training dataset for the meta-model 904 are discussed with reference to FIGS. 5-7. Within the meta-model 904, various specialized models are included, such as a bias model 906A (described in further detail with reference to FIG. 5), a toxicity model 906B (described in further detail with reference to FIG. 6), an IP violation model 906C (described in further detail with reference to FIG. 7), and other validation models 906D. Each of the models is responsible for detecting and assessing specific types of non-compliant content within AI models. Upon processing the training dataset 902, each model generates validation actions tailored to evaluate the presence or absence of specific types of non-compliant content. Further evaluation techniques in generating validation actions using the meta-model 904 are discussed with reference to FIGS. 5-8.

The set of generated validation actions 908 is provided as input to an AI application 910 in the form of a prompt. The AI application 910 processes the validation actions 908 and produces an outcome along with an explanation 912 detailing how the outcome was determined. Subsequently, based on the outcome and explanation 912 provided by the AI application 910, the system can generate recommendations 914 for corrective actions. The recommendations are derived from the analysis of the validation action outcomes and aim to address any identified issues or deficiencies. For example, if certain validation actions fail to meet the desired criteria due to specific attribute values or patterns, the recommendations can suggest adjustments to those attributes or modifications to the underlying processes.

For a bias detection model, such as the ML model discussed in FIG. 5, if certain attributes exhibit unexpected associations or distributions, the system can retrain the tested AI model with revised weighting schemes to better align with the desired vector constraints. In a toxicity model, such as the ML model discussed in FIG. 6, the corrective actions can include implementing post-processing techniques in the tested AI model to filter out responses that violate the vector constraints (e.g., filtering out responses that include the identified vector representations of the alphanumeric characters). Similarly, in an IP rights violation model, such as the ML model discussed in FIG. 7, the corrective actions can include implementing post-processing techniques in the tested AI model to filter out responses that violate the IP rights (e.g., filtering out responses including the predetermined alphanumeric characters).

In some implementations, based on the outcomes and explanations, the system applies predefined rules or logic to determine appropriate corrective actions. The rules can be established by users and can consider factors such as regulatory compliance, risk assessment, and business objectives. For example, if an application is rejected due to insufficient income, the system can recommend requesting additional financial documentation from the applicant.

In some implementations, the system can use machine learning models to generate recommendations. The models learn from historical data and past decisions to identify patterns and trends that indicate a set of actions the AI model can take to comply with the vector constraints. By training on a dataset of past corrective actions and the outcomes, the machine learning models can predict the most effective recommendations for new cases. Further discussion of Artificial Intelligence and training methods are discussed in FIG. 12. The recommendations 914 can be automatically implemented as corrective actions 916 by the system. The automated approach streamlines the process of addressing identified issues and ensures swift remediation of non-compliant content within AI models, enhancing overall compliance and reliability.

Figure 10:
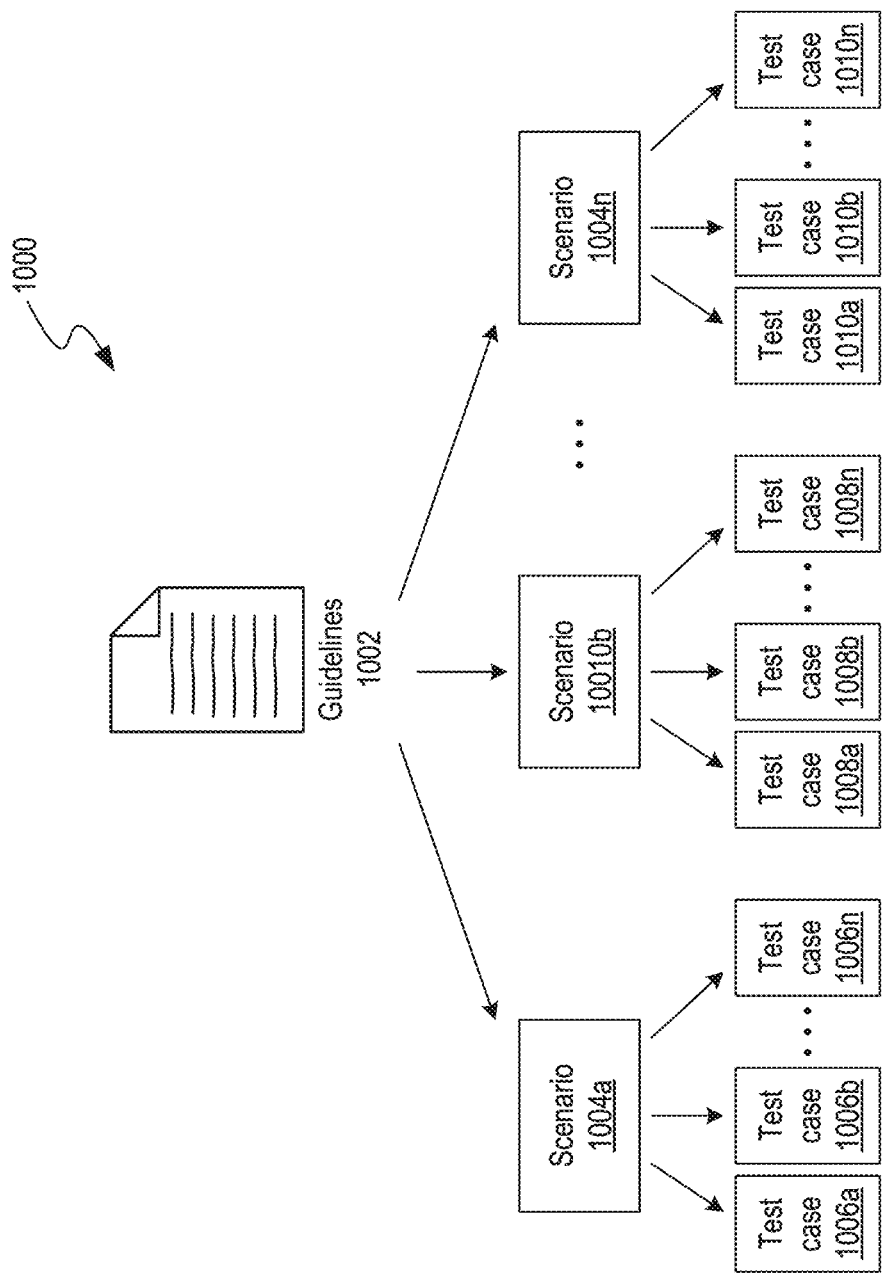
FIG. 10 is a block diagram illustrating an example environment generating test cases from the guidelines, in accordance with some implementations of the present technology.

FIG. 10 is a block diagram illustrating an example environment 1000 generating test cases from the guidelines, in accordance with some implementations of the present technology. Environment 1000 includes guidelines 1002, scenarios 1004*a-n*, and test cases 1006*a-n*, 1008*a-n*, and 1010*a-n*. Guidelines 1002 can be any of guidelines 102 illustrated and described in more detail with reference to FIG. 1. Test cases 1006*a-n*, 1008*a-n*, and 1010*a-n* can be any of test case 304 illustrated and described in more detail with reference to FIG. 3 or validation actions 708 in FIG. 7. Likewise, embodiments of example environment 1000 can include different and/or additional components or can be connected in different ways.

Guidelines 1002 are extracted from regulatory documents and organizational policies and stored in a vector space for efficient retrieval and processing. Documents are translated into a structured format, such as Gherkin. Gherkin is a human-readable language, so translating the guidelines into Gherkin format helps standardize the specifications' representation and makes the specifications more accessible in the compliance assessment process. The translated guidelines can be transformed and stored in the vector stores.

Guidelines 1002 is split into different scenarios 1004*a-n*, for a total of n scenarios, where each scenario 1004 represents a specific topic outlined in the guidelines. For example, regulatory documents contain provisions covering various topics such as data privacy, fairness, transparency, and accountability, each of which can be a scenario 1004. The scenarios 1004 serve as the basis for constructing test cases that encompass a range of possible inputs, outputs, and outcomes.

The system can define scenarios 1004*a-n* based on predefined rules or criteria derived from the guidelines 1002. The rules or criteria can be defined manually by users or generated automatically using machine learning techniques. The system can parse through the guidelines 1002 to extract information that matches the predefined rules or criteria. For example, if the guidelines 1002 specify certain conditions or constraints for data privacy or model fairness, the system identifies sections or passages in the guidelines 1002 that address the corresponding aspects. After identifying the relevant sections or passages of the guidelines (discussed further with reference to FIG. 3), the system groups them into distinct scenarios 1004 based on common themes or topics. Each scenario 1004 represents a specific aspect or requirement outlined in the guidelines 1002. For instance, if the guidelines 1002 cover topics such as data privacy, model transparency, and algorithmic fairness, the system creates scenarios 1004 corresponding to each of these topics.

Machine learning techniques can be applied to identify patterns or clusters within the guidelines and automatically categorize the guidelines 1002 into relevant scenarios 1004 based on similarity or relevance. Natural Language Processing (NLP) techniques can be used to identify the scenarios 1004 from the guidelines 1002. The system can use named entity recognition (NER), in some implementations, to identify specific terms, phrases, or clauses within the guidelines 1002 that pertain to different scenarios 1004. For example, NER can be used to identify mentions of "data privacy," "fairness," "transparency," "accountability," or other terms of interest within the guidelines 1002. By recognizing the named entities, the system can categorize the guidelines 1002 into different scenarios 1004. In some implementations, sentiment analysis can be applied to assess the tone and sentiment of the guidelines 1002 towards each scenario 1004, allowing the system to understand whether a particular provision of the guideline 1002 is framed as a requirement, recommendation, or prohibition. For example, sentiment analysis can determine whether a guideline 1002 related to data privacy imposes strict obligations on data controllers or merely provides guidelines for best practices. Syntactic parsing can be used by the system to analyze the grammatical structure within the guidelines 1002 and extract information that helps the system categorize the guidelines 1002 into scenarios 1004. For example, by parsing the syntax of regulatory provisions, the system can identify relationships between different compliance requirements in the guidelines 1002 and determine the scope and applicability of each provision.

In some implementations, clustering algorithms, such as k-means or hierarchical clustering, can be used to identify scenarios 1004 based on the guideline's 1002 content or features by partitioning the guideline 1002 into clusters, where the content within each cluster are more similar to each other than the content in different clusters. After clustering the content within guideline 1002, the system can assign each cluster to a relevant scenario 1004 based on the cluster's content or theme. For example, if a cluster predominantly discusses data privacy regulations, the cluster is assigned to a scenario 1004 related to data privacy compliance.

In some implementations, deep learning techniques (e.g., recurrent neural networks (RNNs)) are used to learn latent representations of the guideline 1002 and automatically cluster the guideline 1002 based on learned representations. In some implementations, ensemble learning techniques, such as Random Forests or Gradient Boosting Machines (GBMs), are used to combine multiple clustering algorithms or models to improve the accuracy of the clustering process by aggregating the predictions of multiple base models to produce a final clustering solution, which can be more reliable than individual models alone.

Within each scenario 1004, the scenario 1004 is further divided into individual test cases 1006*a-n*, for a total of n test cases, where each test case 1006 is designed to evaluate a particular aspect or requirement specified in the scenario 1004, allowing for thorough testing of AI applications against the set of criteria outlined in the guidelines. For example, if a scenario 1004 relates to data privacy regulations, individual test cases 1006 can focus on aspects such as data encryption, user consent mechanisms, or data retention policies. The test cases 1006 can include prompts, expected outcomes, and expected explanations. The prompts provide inputs to the AI application under test, while the expected outcomes specify the desired responses or actions expected from the AI application. The expected explanations articulate the rationale or reasoning behind the expected outcomes. Example expected outcomes and expected explanations of the test cases 1006 are discussed further in FIG. 3. Some guidelines 1002 may not directly translate into scenarios 1004 or test cases 1006, requiring the use of glue code or other validation techniques to bridge the gap. The glue code operates as the intermediary code or script that implements custom logic or algorithms to translate abstract guidelines into concrete test cases. For instance, if a guideline 1002 emphasizes "Ensuring fairness in algorithmic decision-making," the glue code extracts relevant features from the AI model's decision-making process, such as demographic information or historical data. The glue code assesses fairness metrics, like disparate impact or demographic parity to bridge the gap between abstract guidelines and actionable evaluations.

Figure 11:
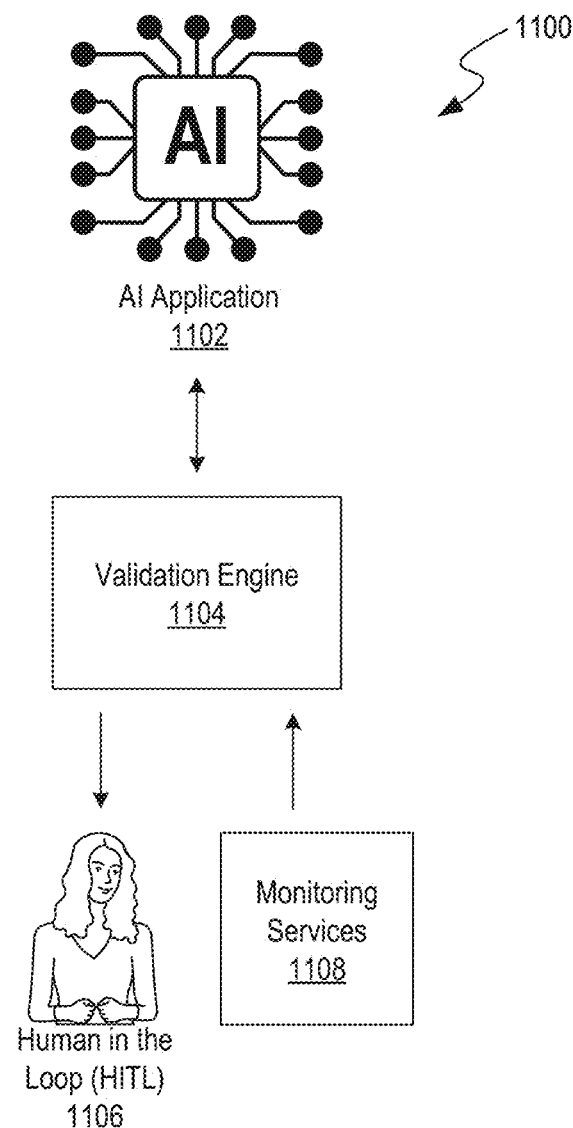
FIG. 11 is a block diagram illustrating an example environment monitoring the validation engine for determining AI compliance, in accordance with some implementations of the present technology.

FIG. 11 is a block diagram illustrating an example environment 1100 monitoring the validation engine for determining AI compliance, in accordance with some implementations of the present technology. Environment 1100 includes AI application 1102, validation engine 1104, human-in-the-loop (HITL) validation 1106, and monitoring services 1108. Validation engine 1104 is the same as or similar to validation engine 104 illustrated and described in more detail with reference to FIG. 1 and validation engine 212 in FIG. 2. Validation engine 1104 is implemented using components of example computer system 1300 illustrated and described in more detail with reference to FIG. 13. Likewise, embodiments of example environment 1100 can include different and/or additional components or can be connected in different ways.

The AI application 1102 generates outputs based on input data and internal algorithms. These outputs are fed into the validation engine 1104, which employs algorithms and validation scripts to assess the compliance of the AI model in the AI application 1102 with predefined guidelines and criteria (e.g., test cases 1006*a-n*, 1008*a-n*, and 1010*a-n* in FIG. 10). Methods of evaluating the AI application 1102's compliance with the predefined guidelines and criteria are discussed in further detail with references to FIGS. 3-11. In some implementations, to further validate the AI application 1102, the system includes HITL validation 1106, where users review the assessment results, identify any discrepancies or ambiguities, and provide feedback to improve the validation process.

HITL validation 1106 allows users to provide feedback and annotations on the validation engine's 1104 conclusions and recommendations, assessing the validation engine 1104 for accuracy, fairness, and/or ethical compliance. The user feedback helps further ensure the AI application's 1102 compliance with regulatory requirements. In some implementations, the system includes user interfaces and feedback mechanisms that allow users to review the validation engine's 1104 conclusions and recommendations. For example, the system can include dashboard interfaces for visualizing the validation engine 1104's outputs, annotation tools for highlighting potential issues, and communication channels between users for adjusting the operational parameters of the validation engine 1104.

Monitoring services 1108 are used, in some implementations, to continuously monitor the validation engine's 1104 performance and correctness. Monitoring services 1108 track the validation process in real-time, identifying any anomalies or deviations from expected behavior. If discrepancies are detected, corrective actions can be taken to adjust the validation engine's 1104 operational parameters to ensure a reliable assessment of AI compliance. Monitoring services 1108 use metrics and alerts to flag any deviations or anomalies, which can be used to determine and/or implement corrective actions. In some implementations, the system incorporates automated corrective actions that can be triggered in response to detected anomalies. The corrective actions can include adjusting the operational parameters of the validation engine 1104, such as tuning validation thresholds, updating validation scripts, or scaling resources to handle increased validation workload. In some implementations, the monitoring services 1108 uses rule-based approaches to flag deviations or anomalies based on predefined thresholds or criteria. For example, if the validation throughput drops below a certain threshold or the error rate exceeds a predefined limit, the monitoring services 1108 triggers alerts indicating potential issues.

AI System

Figure 12:
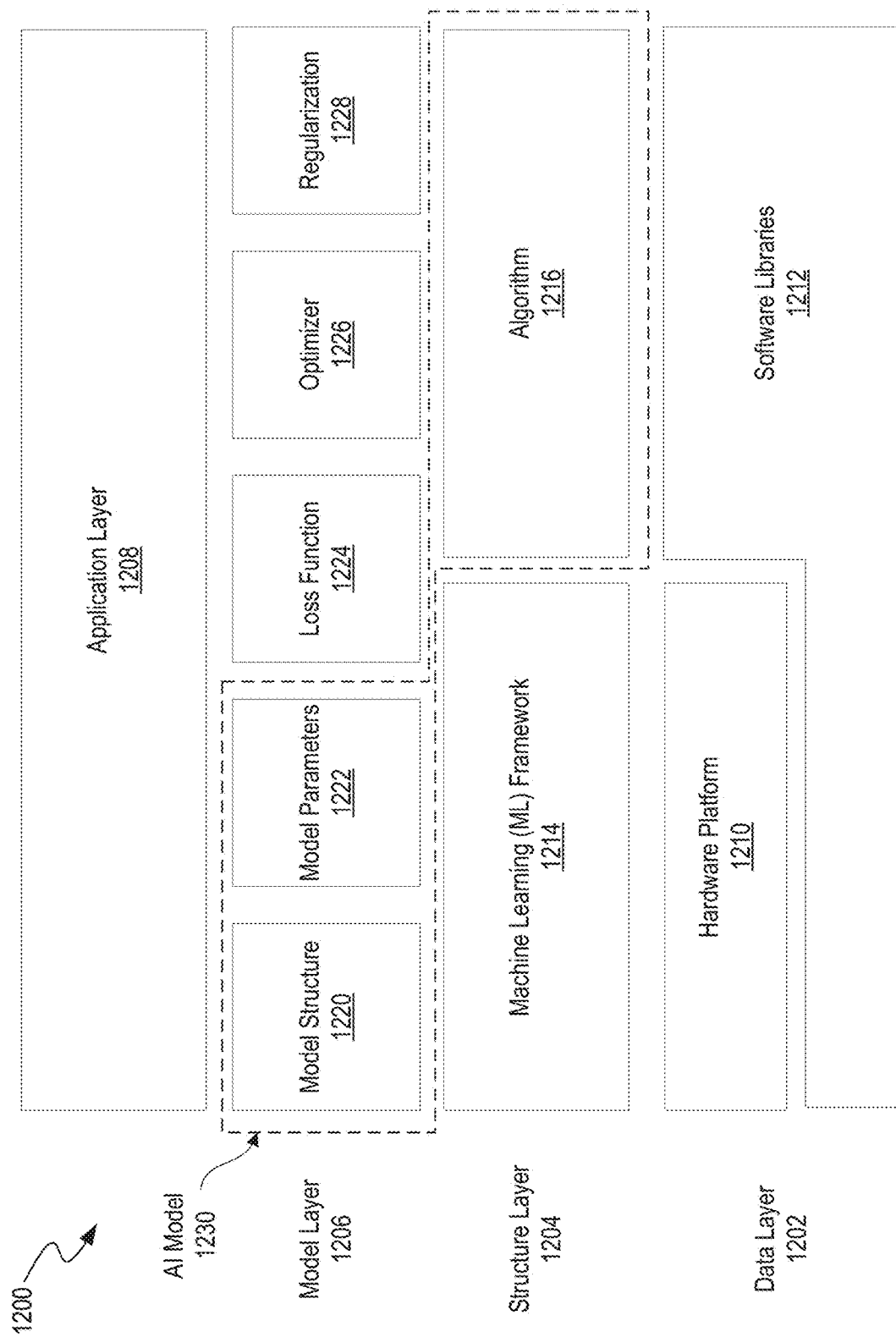
FIG. 12 is a high-level block diagram illustrating an example AI system, in accordance with one or more implementations.

FIG. 12 is a high-level block diagram illustrating an example AI system, in accordance with one or more implementations. The AI system 1200 is implemented using components of the example computer system 1300 illustrated and described in more detail with reference to FIG. 13. Likewise, implementations of the AI system 1200 include different and/or additional components or be connected in different ways.

In some implementations, as shown in FIG. 12, the AI system 1200 includes a set of layers, which conceptually organize elements within an example network topology for the AI system's architecture to implement a particular AI model 1230. Generally, an AI model 1230 is a computer-executable program implemented by the AI system 1200 that analyses data to make predictions. Information passes through each layer of the AI system 1200 to generate outputs for the AI model 1230. The layers include a data layer 1202, a structure layer 1204, a model layer 1206, and an application layer 1208. The algorithm 1216 of the structure layer 1204 and the model structure 1220 and model parameters 1222 of the model layer 1206 together form the example AI model 1230. The optimizer 1226, loss function engine 1224, and regularization engine 1228 work to refine and optimize the AI model 1230, and the data layer 1202 provides resources and support for the application of the AI model 1230 by the application layer 1208.

The data layer 1202 acts as the foundation of the AI system 1200 by preparing data for the AI model 1230. As shown, in some implementations, the data layer 1202 includes two sub-layers: a hardware platform 1210 and one or more software libraries 1212. The hardware platform 1210 is designed to perform operations for the AI model 1230 and includes computing resources for storage, memory, logic, and networking, such as the resources described in relation to FIGS. 1-9. The hardware platform 1210 processes amounts of data using one or more servers. The servers can perform backend operations such as matrix calculations, parallel calculations, machine learning (ML) training, and the like. Examples of servers used by the hardware platform 1210 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to vast computing and memory resources. GPUs use a parallel structure that generally makes processing more efficient than that of CPUs. In some instances, the hardware platform 1210 includes Infrastructure as a Service (IaaS) resources, which are computing resources, (e.g., servers, memory, etc.) offered by a cloud services provider. In some implementations, the hardware platform 1210 includes computer memory for storing data about the AI model 1230, application of the AI model 1230, and training data for the AI model 1230. In some implementations, the computer memory is a form of random-access memory (RAM), such as dynamic RAM, static RAM, and non-volatile RAM.

In some implementations, the software libraries 1212 are thought of as suites of data and programming code, including executables, used to control the computing resources of the hardware platform 1210. In some implementations, the programming code includes low-level primitives (e.g., fundamental language elements) that form the foundation of one or more low-level programming languages, such that servers of the hardware platform 1210 can use the low-level primitives to carry out specific operations. The low-level programming languages do not require much, if any, abstraction from a computing resource's instruction set architecture, allowing them to run quickly with a small memory footprint. Examples of software libraries 1212 that can be included in the AI system 1200 include Intel Math Kernel Library, Nvidia cuDNN, Eigen, and Open BLAS.

In some implementations, the structure layer 1204 includes an ML framework 1214 and an algorithm 1216. The ML framework 1214 can be thought of as an interface, library, or tool that allows users to build and deploy the AI model 1280. In some implementations, the ML framework 1214 includes an open-source library, an application programming interface (API), a gradient-boosting library, an ensemble method, and/or a deep learning toolkit that works with the layers of the AI system facilitate development of the AI model 1230. For example, the ML framework 1214 distributes processes for the application or training of the AI model 1230 across multiple resources in the hardware platform 1210. In some implementations, the ML framework 1214 also includes a set of pre-built components that have the functionality to implement and train the AI model 1230 and allow users to use pre-built functions and classes to construct and train the AI model 1230. Thus, the ML framework 1214 can be used to facilitate data engineering, development, hyperparameter tuning, testing, and training for the AI model 1230. Examples of ML frameworks 1214 that can be used in the AI system 1200 include TensorFlow, PyTorch, Scikit-Learn, Keras, Caffe, LightGBM, Random Forest, and Amazon Web Services.

In some implementations, the algorithm 1216 is an organized set of computer-executable operations used to generate output data from a set of input data and can be described using pseudocode. In some implementations, the algorithm 1216 includes complex code that allows the computing resources to learn from new input data and create new/modified outputs based on what was learned. In some implementations, the algorithm 1216 builds the AI model 1230 through being trained while running computing resources of the hardware platform 1210. The training allows the algorithm 1216 to make predictions or decisions without being explicitly programmed to do so. Once trained, the algorithm 1216 runs at the computing resources as part of the AI model 1230 to make predictions or decisions, improve computing resource performance, or perform tasks. The algorithm 1216 is trained using supervised learning, unsupervised learning, semi-supervised learning, and/or reinforcement learning. The application layer 1208 describes how the AI system 1200 is used to solve problems or perform tasks.

As an example, to train an AI model 1230 that is intended to model human language (also referred to as a language model), the data layer 1202 is a collection of text documents, referred to as a text corpus (or simply referred to as a corpus). The corpus represents a language domain (e.g., a single language), a subject domain (e.g., scientific papers), and/or encompasses another domain or domains, be they larger or smaller than a single language or subject domain. For example, a relatively large, multilingual, and non-subject-specific corpus is created by extracting text from online web pages and/or publicly available social media posts. In some implementations, data layer 1202 is annotated with ground truth labels (e.g., each data entry in the training dataset is paired with a label), or unlabeled.

Training an AI model 1230 generally involves inputting into an AI model 1230 (e.g., an untrained ML model) data layer 1202 to be processed by the AI model 1230, processing the data layer 1202 using the AI model 1230, collecting the output generated by the AI model 1230 (e.g., based on the inputted training data), and comparing the output to a desired set of target values. If the data layer 1202 is labeled, the desired target values, in some implementations, are, e.g., the ground truth labels of the data layer 1202. If the data layer 1202 is unlabeled, the desired target value is, in some implementations, a reconstructed (or otherwise processed) version of the corresponding AI model 1230 input (e.g., in the case of an autoencoder), or is a measure of some target observable effect on the environment (e.g., in the case of a reinforcement learning agent). The parameters of the AI model 1230 are updated based on a difference between the generated output value and the desired target value. For example, if the value outputted by the AI model 1230 is excessively high, the parameters are adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the AI model 1230 typically is to minimize a loss function or maximize a reward function.

In some implementations, the data layer 1202 is a subset of a larger data set. For example, a data set is split into three mutually exclusive subsets: a training set, a validation (or cross-validation) set, and a testing set. The three subsets of data, in some implementations, are used sequentially during AI model 1230 training. For example, the training set is first used to train one or more ML models, each AI model 1230, e.g., having a particular architecture, having a particular training procedure, being describable by a set of model hyperparameters, and/or otherwise being varied from the other of the one or more ML models. The validation (or cross-validation) set, in some implementations, is used as input data into the trained ML models to, e.g., measure the performance of the trained ML models and/or compare performance between them. In some implementations, where hyperparameters are used, a new set of hyperparameters is determined based on the measured performance of one or more of the trained ML models, and the first act of training (i.e., with the training set) begins again on a different ML model described by the new set of determined hyperparameters. The steps are repeated to produce a more performant trained ML model. Once such a trained ML model is obtained (e.g., after the hyperparameters have been adjusted to achieve a desired level of performance), a third act of collecting the output generated by the trained ML model applied to the third subset (the testing set) begins in some implementations. The output generated from the testing set, in some implementations, is compared with the corresponding desired target values to give a final assessment of the trained ML model's accuracy. Other segmentations of the larger data set and/or schemes for using the segments for training one or more ML models are possible.

Backpropagation is an algorithm for training an AI model 1230. Backpropagation is used to adjust (also referred to as update) the value of the parameters in the AI model 1230, with the goal of optimizing the objective function. For example, a defined loss function is calculated by forward propagation of an input to obtain an output of the AI model 1230 and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. In some implementations, other techniques for learning the parameters of the AI model 1230 are used. The process of updating (or learning) the parameters over many iterations is referred to as training. In some implementations, training is carried out iteratively until a convergence condition is met (e.g., a predefined maximum number of iterations has been performed, or the value outputted by the AI model 1230 is sufficiently converged with the desired target value), after which the AI model 1230 is considered to be sufficiently trained. The values of the learned parameters are then fixed and the AI model 1230 is then deployed to generate output in real-world applications (also referred to as "inference").

In some examples, a trained ML model is fine-tuned, meaning that the values of the learned parameters are adjusted slightly in order for the ML model to better model a specific task. Fine-tuning of an AI model 1230 typically involves further training the ML model on a number of data samples (which may be smaller in number/cardinality than those used to train the model initially) that closely target the specific task. For example, an AI model 1230 for generating natural language that has been trained generically on publicly available text corpora is, e.g., fine-tuned by further training using specific training samples. In some implementations, the specific training samples are used to generate language in a certain style or a certain format. For example, the AI model 1230 is trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

In some implementations, the language model uses a neural network (typically a DNN) to perform NLP tasks. A language model is trained to model how words relate to each other in a textual sequence, based on probabilities. In some implementations, the language model contains hundreds of thousands of learned parameters, or in the case of a large language model (LLM) contains millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Although a general transformer architecture for a language model and the model's theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that is considered to be an encoder-only language model. A decoder-only language model accepts embeddings as input and uses auto-regression to generate an output text sequence. Transformer-XL and GPT-type models are language models that are considered to be decoder-only language models.

Because GPT-type language models tend to have a large number of parameters, these language models are considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that GPT-3 can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model is hosted by a computer system that includes a plurality of cooperating (e.g., cooperating via a network) computer systems that are in, for example, a distributed arrangement. Notably, a remote language model employs a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real-time or near real-time) can require the use of a plurality of processors/cooperating computing devices as discussed above.

In some implementations, inputs to an LLM are referred to as a prompt (e.g., command set or instruction set), which is a natural language input that includes instructions to the LLM to generate a desired output. In some implementations, a computer system generates a prompt that is provided as input to the LLM via the LLM's API. As described above, the prompt is processed or pre-processed into a token sequence prior to being provided as input to the LLM via the LLM's API. A prompt includes one or more examples of the desired output, which provides the LLM with additional information to enable the LLM to generate output according to the desired output. Additionally or alternatively, the examples included in a prompt provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples is referred to as a zero-shot prompt.

In some implementations, the llama2 is used as a large language model, which is a large language model based on an encoder-decoder architecture, and can simultaneously perform text generation and text understanding. The llama2 selects or trains proper pre-training corpus, pre-training targets and pre-training parameters according to different tasks and fields, and adjusts a large language model on the basis so as to improve the performance of the large language model under a specific scene.

In some implementations, the Falcon40B is used as a large language model, which is a causal decoder-only model. During training, the model predicts the subsequent tokens with a causal language modeling task. The model applies rotational positional embeddings in the model's transformer model and encodes the absolution positional information of the tokens into a rotation matrix.

In some implementations, the Claude is used as a large language model, which is an autoregressive model trained on a large text corpus unsupervised.

Computing Platform

Figure 13:
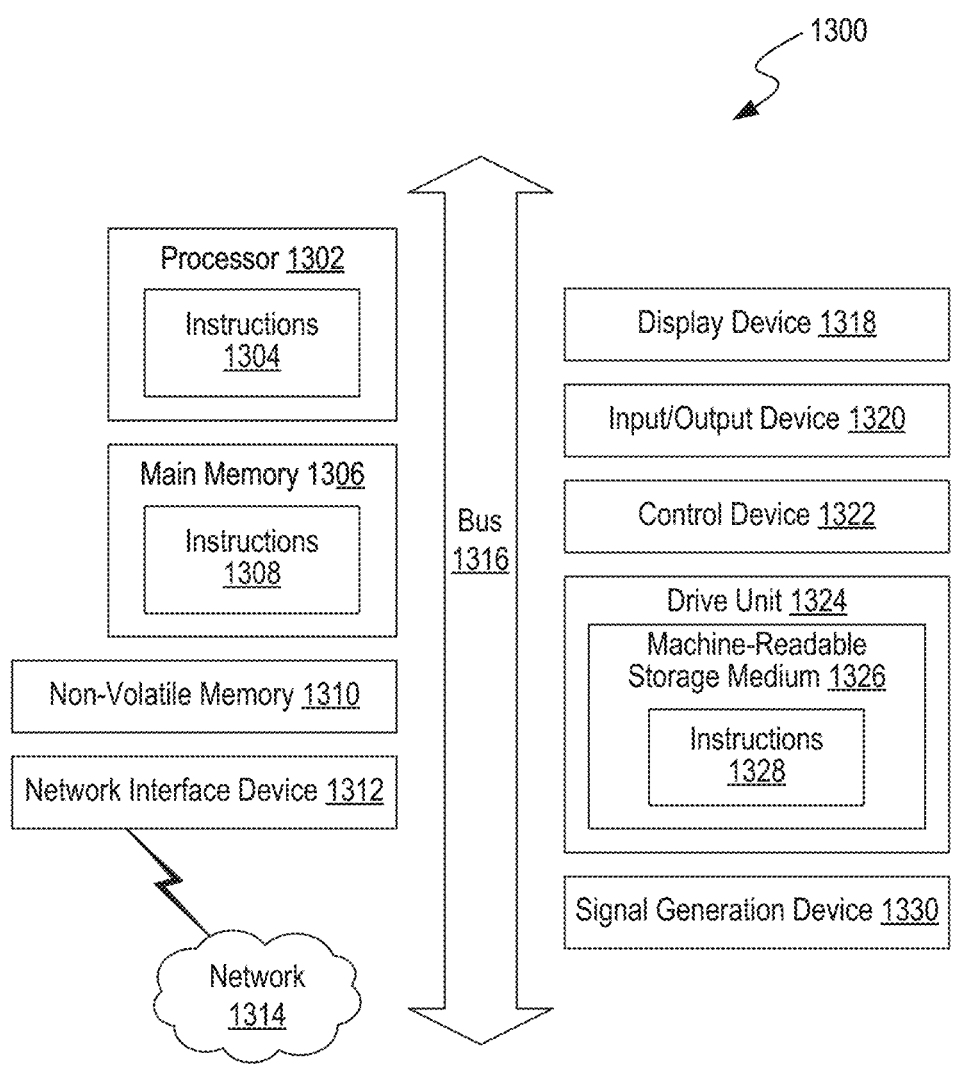
FIG. 13 is a block diagram illustrating an example computer system, in accordance with one or more implementations.

FIG. 13 is a block diagram illustrating an example computer system 1300, in accordance with one or more implementations. In some implementations, components of the example computer system 1300 are used to implement the software platforms described herein. At least some operations described herein can be implemented on the computer system 1300.

In some implementations, the computer system 1300 includes one or more central processing units ("processors") 1302, main memory 1306, non-volatile memory 1310, network adapters 1312 (e.g., network interface), video displays 1318, input/output devices 1320, control devices 1322 (e.g., keyboard and pointing devices), drive units 1324 including a storage medium 1326, and a signal generation device 1320 that are communicatively connected to a bus 1316. The bus 1316 is illustrated as an abstraction that represents one or more physical buses and/or point-to-point connections that are connected by appropriate bridges, adapters, or controllers. The bus 1316, therefore, includes a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

In some implementations, the computer system 1300 shares a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1300.

While the main memory 1306, non-volatile memory 1310, and storage medium 1326 (also called a "machine-readable medium") are shown to be a single medium, the terms "machine-readable medium" and "storage medium" should be taken to include a single medium or multiple media (e.g., a centralized/distributed database and/or associated caches and servers) that store one or more sets of instructions 1328. The term "machine-readable medium" and "storage medium" shall also be taken to include any medium that is capable of storing, encoding, or carrying a set of instructions for execution by the computer system 1300. In some implementations, the non-volatile memory 1310 or the storage medium 1326 is a non-transitory, computer-readable storage medium storing computer instructions, which is executable by one or more "processors" 1302 to perform functions of the implementations disclosed herein.

In general, the routines executed to implement the implementations of the disclosure can be implemented as part of an operating system or a specific application, component, program, object, module, or sequence of instructions (collectively referred to as "computer programs"). The computer programs typically include one or more instructions (e.g., instructions 1304, 1308, 1328) set at various times in various memory and storage devices in a computer device. When read and executed by one or more processors 1302, the instruction(s) cause the computer system 1300 to perform operations to execute elements involving the various aspects of the disclosure.

Moreover, while implementations have been described in the context of fully functioning computer devices, those skilled in the art will appreciate that the various implementations are capable of being distributed as a program product in a variety of forms. The disclosure applies regardless of the particular type of machine or computer-readable media used to actually affect the distribution.

Further examples of machine-readable storage media, machine-readable media, or computer-readable media include recordable-type media such as volatile and non-volatile memory devices 1310, floppy and other removable disks, hard disk drives, optical discs (e.g., compact disc read-only memory (CD-ROMS), digital versatile discs (DVDs)), and transmission-type media such as digital and analog communication links.

The network adapter 1312 enables the computer system 1300 to mediate data in a network 1314 with an entity that is external to the computer system 1300 through any communication protocol supported by the computer system 1300 and the external entity. The network adapter 1312 includes a network adapter card, a wireless network interface card, a router, an access point, a wireless router, a switch, a multi-layer switch, a protocol converter, a gateway, a bridge, a bridge router, a hub, a digital media receiver, and/or a repeater.

In some implementations, the network adapter 1312 includes a firewall that governs and/or manages permission to access proxy data in a computer network and tracks varying levels of trust between different machines and/or applications. The firewall is any number of modules having any combination of hardware and/or software components able to enforce a predetermined set of access rights between a particular set of machines and applications, machines and machines, and/or applications and applications (e.g., to regulate the flow of traffic and resource sharing between these entities). In some implementations, the firewall additionally manages and/or has access to an access control list that details permissions, including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc. A portion of the methods described herein can be performed using the example AI system 1200 illustrated and described in more detail with reference to FIG. 12.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 3-4 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system for evaluating and correcting responses generated by one or more AI models, the system comprising:
   a first model trained to generate a first output that identifies an existence of certain patterns within a set of responses generated by an AI model by evaluating a representation of a set of attributes identified within the set of responses generated by the AI model,
      wherein the AI model is trained to, in response to a command set, generate the set of responses including a result and a set of descriptors associated with a series of steps to generate the result, and
      wherein each certain pattern represents a disproportionate association of one or more attributes of the set of attributes within one or more of: the result or the set of descriptors associated with a series of steps to generate the result;
   a second model trained to generate a second output that identifies one or more vector representations of alphanumeric characters within the set of responses generated by the AI model by evaluating one or more of:
      (1) proximate locations of the alphanumeric characters within the set of responses,
      (2) a frequency of the alphanumeric characters within the set of responses, or
      (3) an association between the alphanumeric characters within the set of responses;
   a third model trained to generate a third output that identifies one or more indicators of vector alignment associated between the one or more vector representations of the alphanumeric characters within the set of responses generated by the AI model and one or more vector representations of predetermined alphanumeric characters by:
      measuring a set of differences in one or more of: direction or magnitude between the one or more vector representations of the alphanumeric characters in the set of responses generated by the AI model and the one or more vector representations of the predetermined alphanumeric characters, and
      determining the one or more indicators of the vector alignment based on whether a volume of the set of differences satisfies a predetermined threshold; and
   an aggregate model trained to:
      integrate the first output from the first model, the second output from the second model, and the third output from the third model into an overall metric of the AI model indicating a presence of one or more of: the certain patterns, the one or more vector representations of the alphanumeric characters, or the vector alignment, and
      use the overall metric to generate a set of actions to remove a portion of the set of responses generated by the AI model indicated by one or more of: the first output, the second output, or the third output; and
   a graphical user interface (GUI) displaying a graphical layout including (1) a first graphical representation indicating the overall metric of the AI model and (2) a second graphical representation indicating the generated set of actions.

2. The system of claim 1, further comprising:
   a correction module programmed to, using the generated set of actions, automatically implement corrections to remove the portion of the set of responses generated by the AI model indicated by one or more of: the first output, the second output, or the third output,
      wherein the corrections include one or more of: adjusting parameters of the AI model or updating training data of the AI model to remove a portion of the set of responses generated by the AI model indicated by one or more of: the first output, the second output, or the third output.

3. The system of claim 1, further comprising:
   a fourth model trained to identify indicators of compliance of the set of responses generated by the AI model with a predefined set of descriptors associated with one or more operation boundaries of the AI model.

4. The system of claim 1, further comprising:
a testing module programmed to construct a set of validation actions associated with one or more of: the first model, the second model, or the third model,
  wherein each validation action maps to a specific scenario derived from one or more of: the first model, the second model, or the third model,
  wherein each validation action comprises: (1) a command set, (2) an expected result, and (3) an expected explanation, and
  wherein each validation action is configured to test the presence of one or more of: the certain patterns, the one or more vector representations of the alphanumeric characters, or the vector alignment.

5. The system of claim 4, further comprising:
a validation module programmed to evaluate the AI model against the set of validation actions by applying a particular validation action in the set of validation actions to the AI model by:
  supplying the command set of the particular validation action into the AI model;
  responsive to inputting the command set, receiving, from the AI model, a case-specific result and a corresponding case-specific set of descriptors associated with a case-specific series of steps to generate the case-specific result;
  comparing the expected result of the particular validation action to the case-specific result received from the AI model; and
  responsive to the expected result of the particular validation action satisfying the case-specific result received from the AI model, comparing the expected explanation of the particular validation action to the corresponding case-specific set of descriptors of the case-specific result.

6. The system of claim 1, further comprising:
a retraining module configured to train the aggregate model based on feedback of the generated set of actions,
  wherein the feedback includes one or more of: monitored data, user feedback, or performance metrics.

7. The system of claim 1, further comprising:
an intermediate AI model trained to:
  receive an indicator of a type of application associated with the AI model;
  direct the intermediate AI model to identify a relevant set of descriptors associated with the type of the application defining one or more operation boundaries of the AI model; and
  obtain the relevant set of descriptors, via an Application Programming Interface (API).

8. A non-transitory, computer-readable storage medium storing instructions for evaluating and correcting responses generated by one or more AI models, wherein the instructions when executed by at least one data processor of a system, cause the system to:
  generate, using a first model, a first output that identifies an existence of certain patterns within a first set of responses generated by an AI model by evaluating a representation of a set of attributes identified within the first set of responses generated by the AI model,
    wherein the AI model is trained to, in response to a command set, generate the first set of responses including a result and a set of descriptors associated with a series of steps to generate the result, and
    wherein each certain pattern represents a disproportionate association of one or more attributes of the set of attributes within one or more of: the result or the set of descriptors associated with a series of steps to generate the result;
  generate, using a second model, a second output that identifies one or more vector representations of alphanumeric characters within the first set of responses generated by the AI model by evaluating one or more of:
    (1) proximate locations of the alphanumeric characters within the first set of responses,
    (2) a frequency of the alphanumeric characters within the first set of responses, or
    (3) an association between the alphanumeric characters within the first set of responses;
  generate, using a third model, a third output that identifies one or more indicators of vector alignment associated between the one or more vector representations of the alphanumeric characters within the first set of responses generated by the AI model and one or more vector representations of predetermined alphanumeric characters by:
    measuring a set of differences in one or more of: direction or magnitude between the one or more vector representations of the alphanumeric characters in the first set of responses generated by the AI model and the one or more vector representations of the predetermined alphanumeric characters; and
    determining the one or more indicators of the vector alignment based on whether a volume of the set of differences satisfies a predetermined threshold;
  integrate, using an aggregate model, the first output from the first model, the second output from the second model, and the third output from the third model into an overall metric of the AI model indicating a presence of one or more of: the certain patterns, the one or more vector representations of the alphanumeric characters, or the vector alignment; and
  automatically modify the AI model by adjusting one or more parameters of the AI model,
    wherein the modified AI model is trained to, in response to the command set, generate, using the adjusted one or more parameters, a second set of responses without the presence of (i) the certain patterns, (ii) the one or more vector representations of the alphanumeric characters, and (iii) the vector alignment.

9. The non-transitory, computer-readable storage medium of claim 8, wherein the instructions further cause the system to:
  automatically update training data of the AI model to remove a portion of the first set of responses generated by the AI model indicated by one or more of: the first output, the second output, or the third output.

10. The non-transitory, computer-readable storage medium of claim 8, wherein the instructions further cause the system to:
  identify, using a fourth model, indicators of compliance of the first set of responses generated by the AI model with a predefined set of descriptors associated with one or more operation boundaries of the AI model.

11. The non-transitory, computer-readable storage medium of claim 8, wherein the instructions further cause the system to:
  construct a set of validation actions associated with one or more of: the first model, the second model, or the third model, wherein each validation action maps to a specific scenario derived from one or more of: the first model, the second model, or the third model, wherein each validation action comprises: (1) a command set, (2) an expected result, and (3) an expected explanation, and wherein each validation action is configured to test the presence of one or more of: the certain patterns, the one or more vector representations of the alphanumeric characters, or the vector alignment.

12. The non-transitory, computer-readable storage medium of claim 11, wherein the instructions further cause the system to:

evaluate the AI model against the set of validation actions by applying a particular validation action in the set of validation actions to the AI model by:

supplying the command set of the particular validation action into the AI model;

responsive to inputting the command set, receiving, from the AI model, a case-specific result and a corresponding case-specific set of descriptors associated with a case-specific series of steps to generate the case-specific result;

comparing the expected result of the particular validation action to the case-specific result received from the AI model; and responsive to the expected result of the particular validation action satisfying the case-specific result received from the AI model, comparing the expected explanation of the particular validation action to the corresponding case-specific set of descriptors of the case-specific result.

13. The non-transitory, computer-readable storage medium of claim 8, wherein the instructions further cause the system to:

train the aggregate model based on feedback of the generated set of actions, wherein the feedback includes one or more of: monitored data, user feedback, or performance metrics.

14. The non-transitory, computer-readable storage medium of claim 8, wherein the instructions further cause the system to:

receive an indicator of a type of application associated with the AI model;

identify a relevant set of descriptors associated with the type of the application defining one or more operation boundaries of the AI model; and obtain the relevant set of descriptors, via an Application Programming Interface (API).

15. A computer-implemented method for evaluating and correcting responses generated by one or more AI models, the method comprising:

generating, using a first model, a first output that identifies an existence of certain patterns within a set of responses generated by an AI model by evaluating a representation of a set of attributes identified within the set of responses generated by the AI model, wherein the AI model is trained to, in response to a command set, generate the set of responses including a result and a set of descriptors associated with a series of steps to generate the result, and wherein each certain pattern represents a disproportionate association of one or more attributes of the set of attributes within one or more of: the result or the set of descriptors associated with a series of steps to generate the result;

generating, using a second model, a second output that identifies one or more vector representations of alphanumeric characters within the set of responses generated by the AI model by evaluating one or more of:

(1) proximate locations of the alphanumeric characters within the set of responses, (2) a frequency of the alphanumeric characters within the set of responses, or (3) an association between the alphanumeric characters within the set of responses;

Generating, using a third model, a third output that identifies one or more indicators of vector alignment associated between the one or more vector representations of the alphanumeric characters within the set of responses generated by the AI model and one or more vector representations of predetermined alphanumeric characters by:

measuring a set of differences in one or more of: direction or magnitude between the one or more vector representations of the alphanumeric characters in the set of responses generated by the AI model and the one or more vector representations of the predetermined alphanumeric characters; and determining the one or more indicators of the vector alignment based on whether a volume of the set of differences satisfies a predetermined threshold;

integrating, using an aggregate model, the first output from the first model, the second output from the second model, and the third output from the third model into an overall metric of the AI model indicating a presence of one or more of: the certain patterns, the one or more vector representations of the alphanumeric characters, or the vector alignment; and responsive to the overall metric exceeding a predefined threshold:

using the overall metric, generating a set of actions to remove a portion of the set of responses generated by the AI model indicated by one or more of: the first output, the second output, or the third output, displaying, on a graphical user interface (GUI), a graphical layout including (1) a first graphical representation indicating the overall metric and (2) a second graphical representation indicating the generated set of actions, and responsive to a received user input on the GUI, automatically executing the set of actions to remove the portion of the set of responses generated by the AI model.

16. The method of claim 15, further comprising:

using the generated set of actions, automatically implementing corrections to remove the portion of the set of responses generated by the AI model indicated by one or more of: the first output, the second output, or the third output, wherein the corrections include one or more of: adjusting parameters of the AI model or updating training data of the AI model to remove a portion of the set of responses generated by the AI model indicated by one or more of: the first output, the second output, or the third output.

17. The method of claim 15, further comprising:

identifying, using a fourth model, indicators of compliance of the set of responses generated by the AI model with a predefined set of descriptors associated with one or more operation boundaries of the AI model.

18. The method of claim 15, further comprising:
constructing a set of validation actions associated with one or more of: the first model, the second model, or the third model,
    wherein each validation action maps to a specific scenario derived from one or more of: the first model, the second model, or the third model,
    wherein each validation action comprises: (1) a command set, (2) an expected result, and (3) an expected explanation, and
    wherein each validation action is configured to test the presence of one or more of: the certain patterns, the one or more vector representations of the alphanumeric characters, or the vector alignment.

19. The method of claim 18, further comprising:
evaluating the AI model against the set of validation actions by applying a particular validation action in the set of validation actions to the AI model by:
    supplying the command set of the particular validation action into the AI model;
    responsive to inputting the command set, receiving, from the AI model, a case-specific result and a corresponding case-specific set of descriptors associated with a case-specific series of steps to generate the case-specific result;
    comparing the expected result of the particular validation action to the case-specific result received from the AI model; and
    responsive to the expected result of the particular validation action satisfying the case-specific result received from the AI model, comparing the expected explanation of the particular validation action to the corresponding case-specific set of descriptors of the case-specific result.

20. The method of claim 15, further comprising:
training the aggregate model based on feedback of the generated set of actions,
    wherein the feedback includes one or more of: monitored data, user feedback, or performance metrics.

\* \* \* \* \*